(12) United States Patent
Kobayashi et al.

(10) Patent No.: US 9,971,155 B2
(45) Date of Patent: May 15, 2018

(54) HEAD MOUNTED DISPLAY DEVICE AND CONTROL METHOD FOR HEAD MOUNTED DISPLAY DEVICE

(71) Applicant: SEIKO EPSON CORPORATION, Tokyo (JP)

(72) Inventors: Shinichi Kobayashi, Azumino (JP); Toshikazu Uchiyama, Chino (JP); Hitomi Wakamiya, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 240 days.

(21) Appl. No.: 14/901,537

(22) PCT Filed: Jul. 9, 2014

(86) PCT No.: PCT/JP2014/003654
§ 371 (c)(1),
(2) Date: Dec. 28, 2015

(87) PCT Pub. No.: WO2015/004916
PCT Pub. Date: Jan. 15, 2015

(65) Prior Publication Data
US 2016/0161744 A1    Jun. 9, 2016

(30) Foreign Application Priority Data

Jul. 11, 2013   (JP) ................................. 2013-145644
Mar. 27, 2014  (JP) ................................. 2014-065567

(51) Int. Cl.
G02B 27/01     (2006.01)
(52) U.S. Cl.
CPC ....... *G02B 27/0172* (2013.01); *G02B 27/017* (2013.01); *G02B 27/0179* (2013.01);
(Continued)

(58) Field of Classification Search
CPC .......... G02B 27/017; G02B 2027/0138; G02B 2027/014; G02B 2027/0187; G02B 27/0172; G02B 27/0179
See application file for complete search history.

(56) References Cited

U.S. PATENT DOCUMENTS 8,212,859 B2     7/2012   Tang et al.
2002/0044152 A1  4/2002   Abbott et al.
(Continued)

FOREIGN PATENT DOCUMENTS

EP         1521482 A2    4/2005
JP      2005-157317 A    6/2005
(Continued)

OTHER PUBLICATIONS

Jan. 22, 2015 International Search Report issued in International Patent Application No. PCT/JP2014/003654.
(Continued)

*Primary Examiner* — Abhishek Sarma
(74) *Attorney, Agent, or Firm* — Oliff PLC

(57) ABSTRACT

A transmission type head mounted display device includes an image display unit including an image-light generating unit configured to generate image light on the basis of image data and emit the image light, the image display unit causing a user to visually recognize the image light as a virtual image and transmitting an outside scene in a state, a display-unit-direction specifying unit configured to specify a display unit direction, which is a direction of the image display unit, a specific-direction setting unit configured to set a specific direction on the basis of an image light generation region where the image-light generating unit generates the image light and the display unit direction, and a control unit configured to set a position of the image light generation region on the basis of the display unit direction.

14 Claims, 11 Drawing Sheets

(52) U.S. Cl.
CPC ............... *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 2005/0068314 A1* | 3/2005 | Aso | ............ G06T 19/006 345/419 |
| 2005/0088365 A1 | 4/2005 | Yamazaki et al. | |
| 2010/0231705 A1 | 9/2010 | Yahav et al. | |
| 2012/0127284 A1 | 5/2012 | Bar-Zeev | |
| 2012/0293548 A1 | 11/2012 | Perez et al. | |
| 2013/0010103 A1 | 1/2013 | Ihara et al. | |
| 2014/0210853 A1 | 7/2014 | Sasao et al. | |
| 2014/0210859 A1 | 7/2014 | Ihara et al. | |
| 2014/0214606 A1 | 7/2014 | Ihara et al. | |
| 2015/0112586 A1 | 4/2015 | Ihara et al. | |

FOREIGN PATENT DOCUMENTS

| | | |
|---|---|---|
| JP | 2011-175035 A | 9/2011 |
| JP | 2012109708 A | 6/2012 |
| JP | 2013-037606 A | 2/2013 |
| WO | 2011/122654 A1 | 10/2011 |
| WO | 2013/049248 A2 | 4/2013 |

OTHER PUBLICATIONS

Jan. 22, 2015 International Written Opinion issued in International Patent Application No. PCT/JP2014/003654.

Guidelines for Pictures Techniques Used in Animation and Other Content, Picture Techniques Used in Animation and Other Types of Content, Japan Broadcasting Corporation, The Japan Commercial Broadcasters Association. Prepared Apr. 8, 1998, Partially revised on Apr. 1, 2006. pp. 1-2.

Investigation Research Report on the Impact of Video Content on the Body. Ministry of Internal Affairs and Communications, Mar. 2004. p. 1-2.

\* cited by examiner

[Fig. 1]
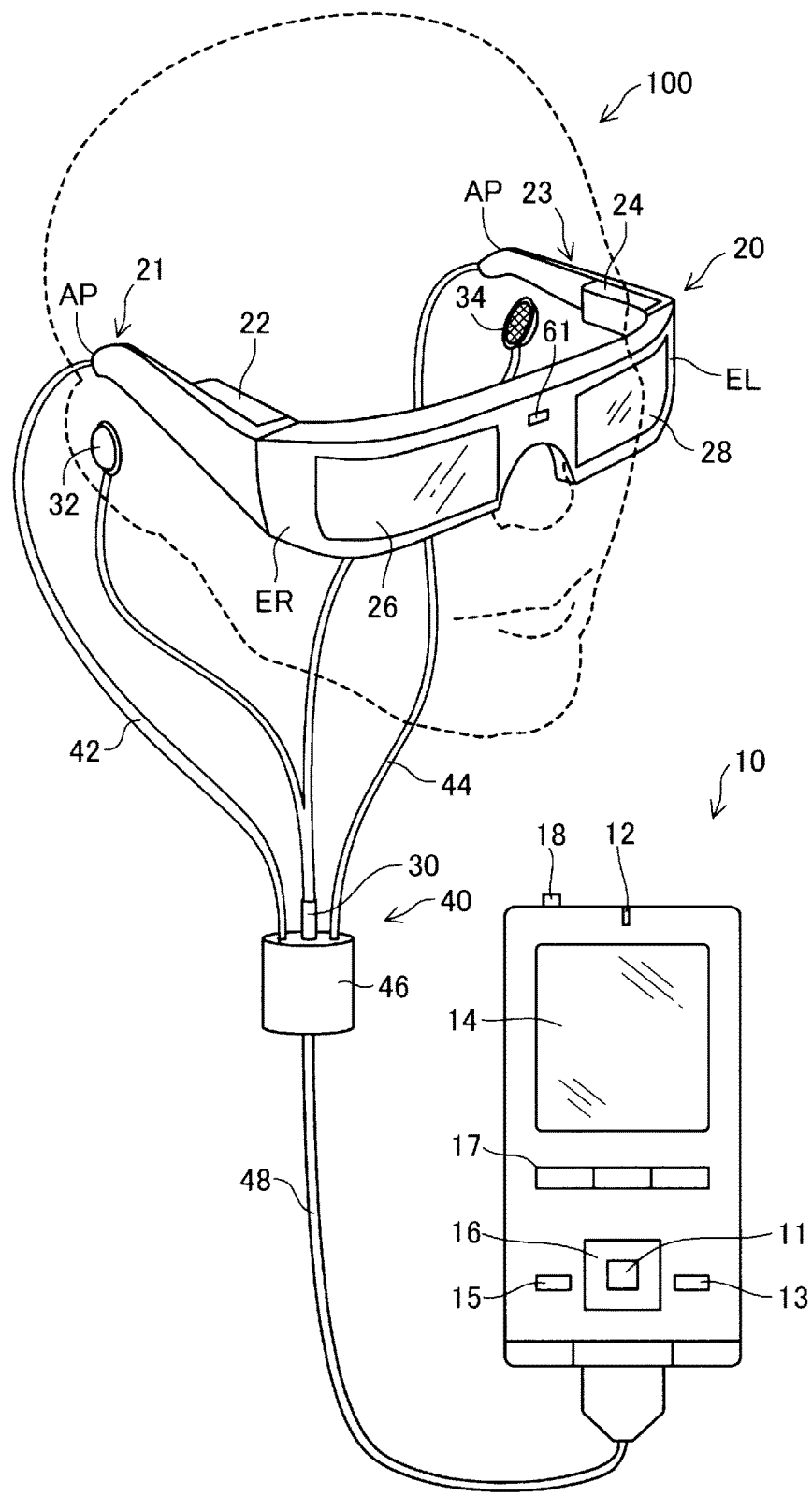

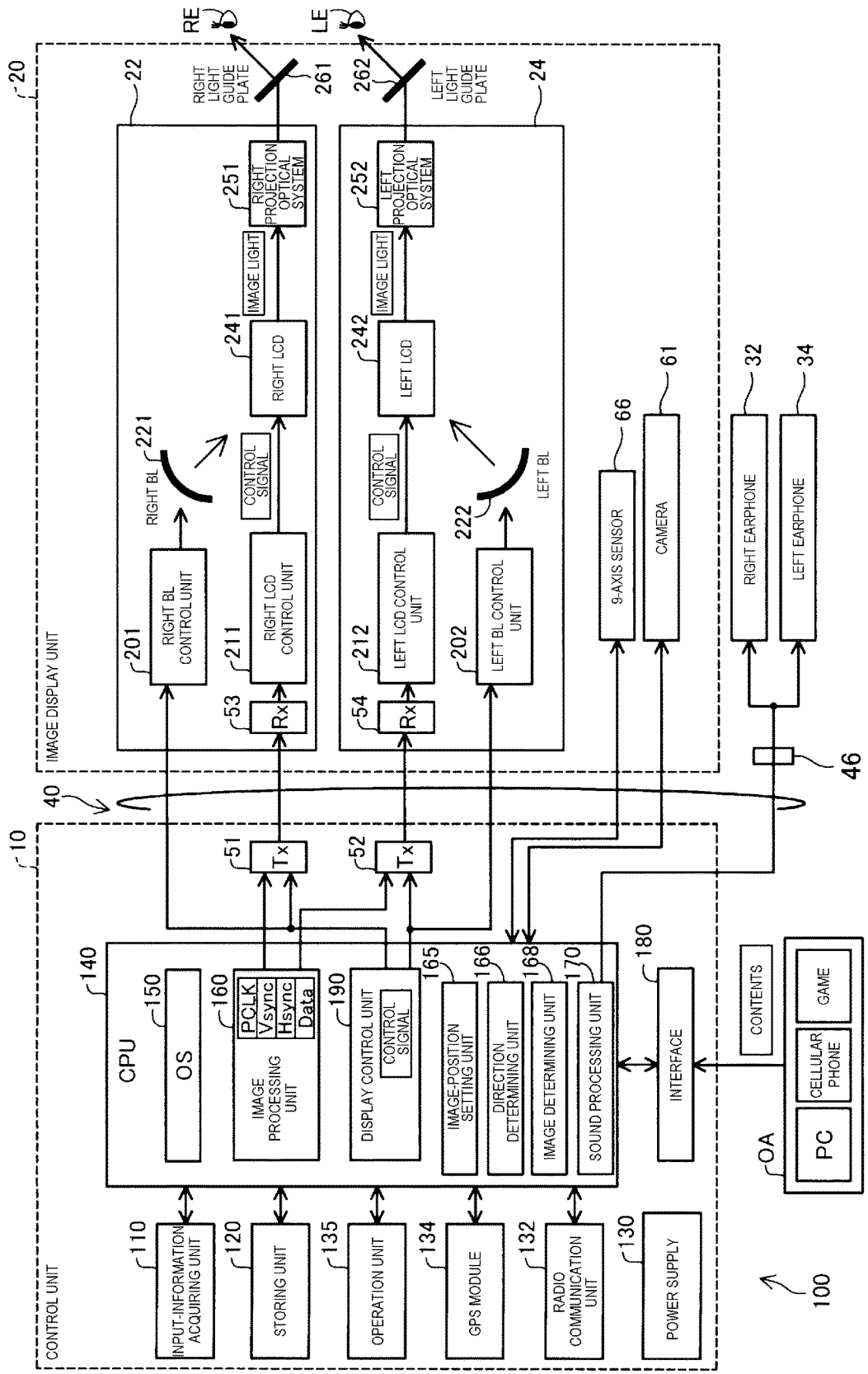
[Fig. 2]

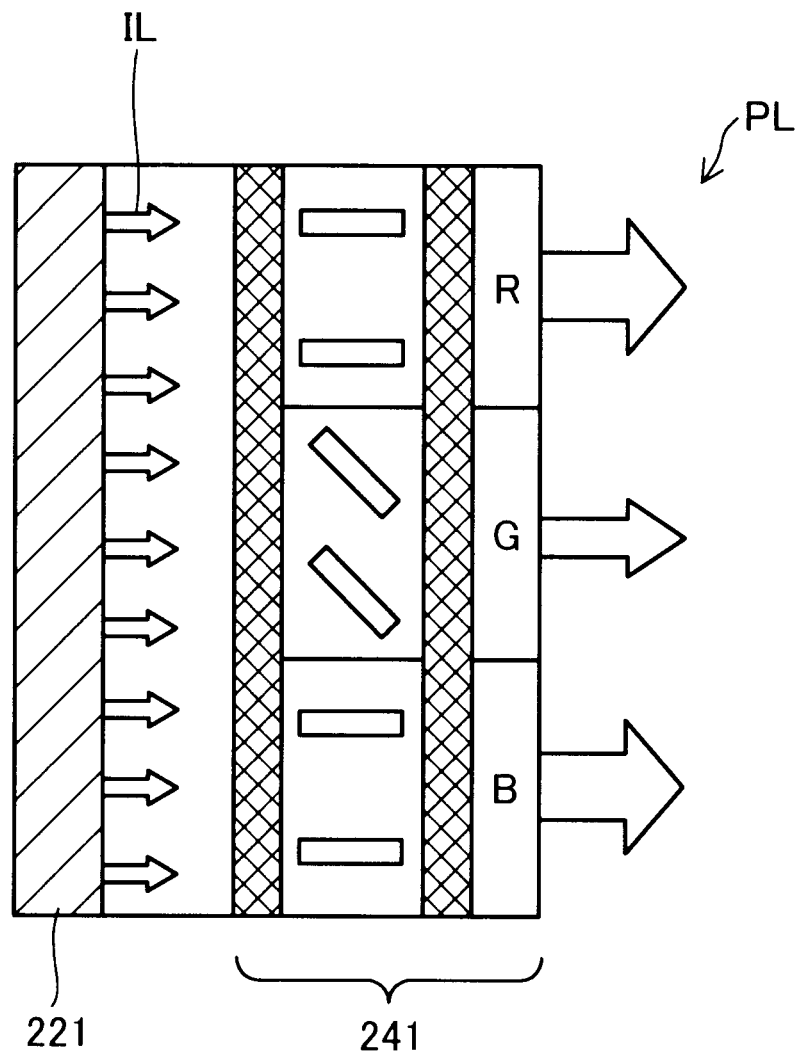
[Fig. 3]

[Fig. 4]
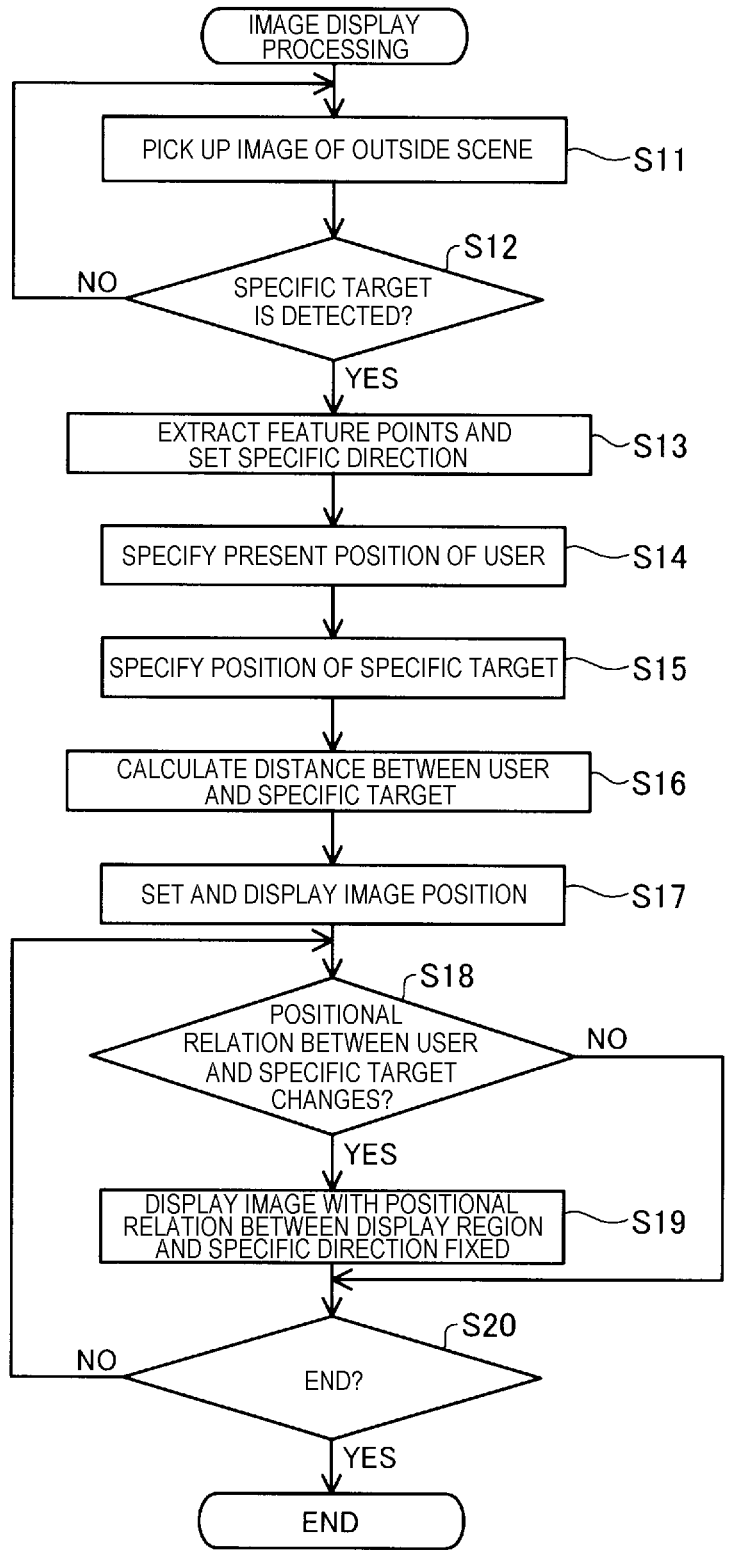

[Fig. 5]
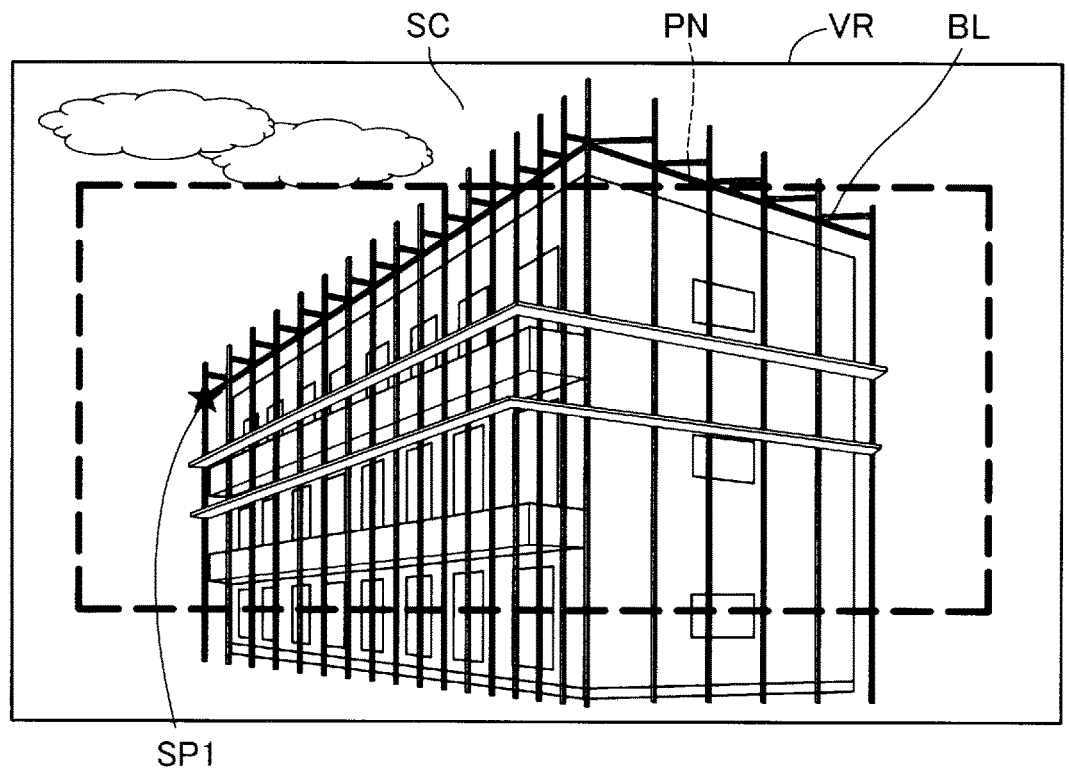
[Fig. 6]
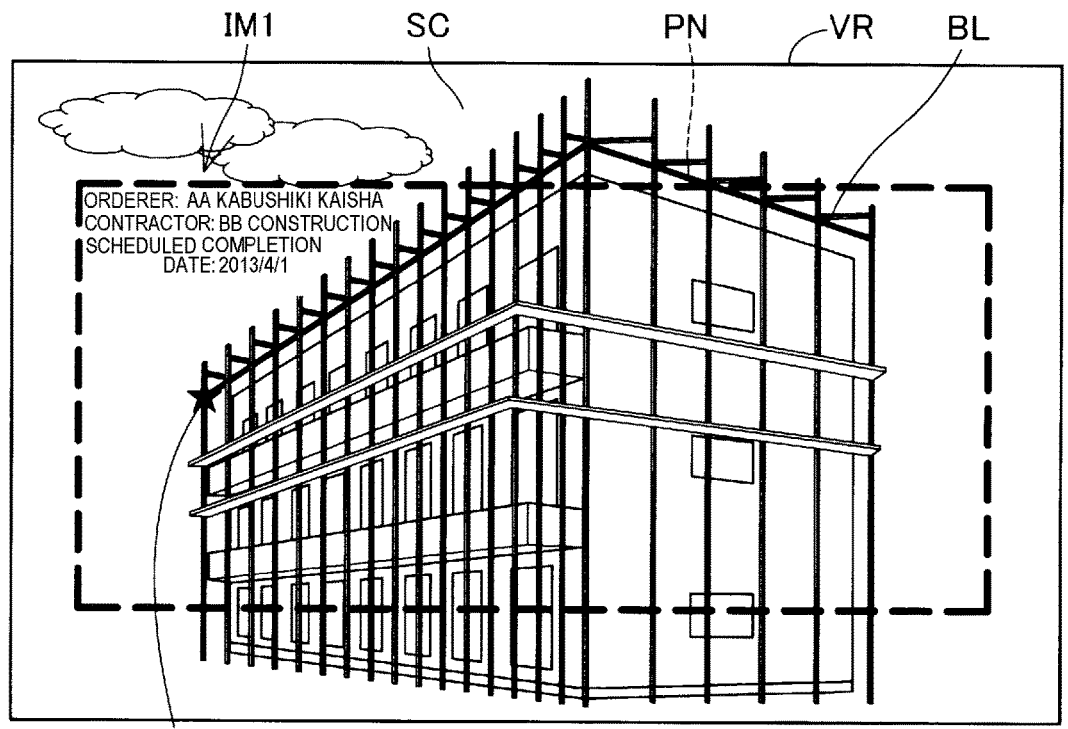

[Fig. 7]
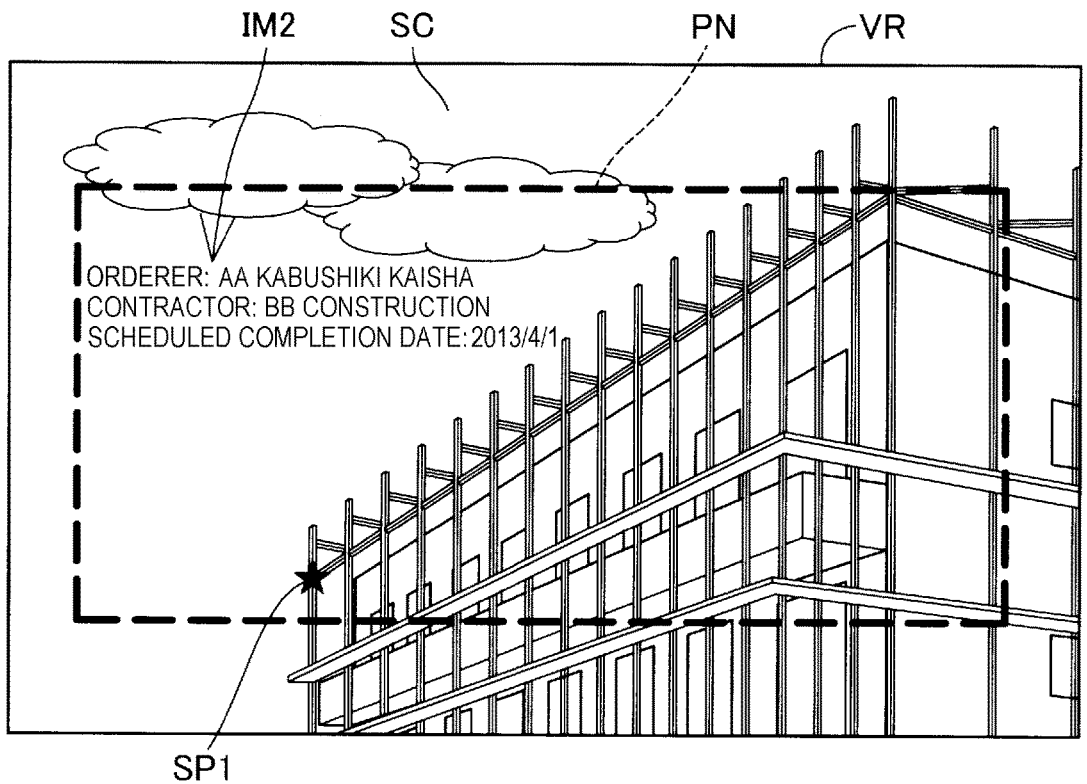
[Fig. 8]
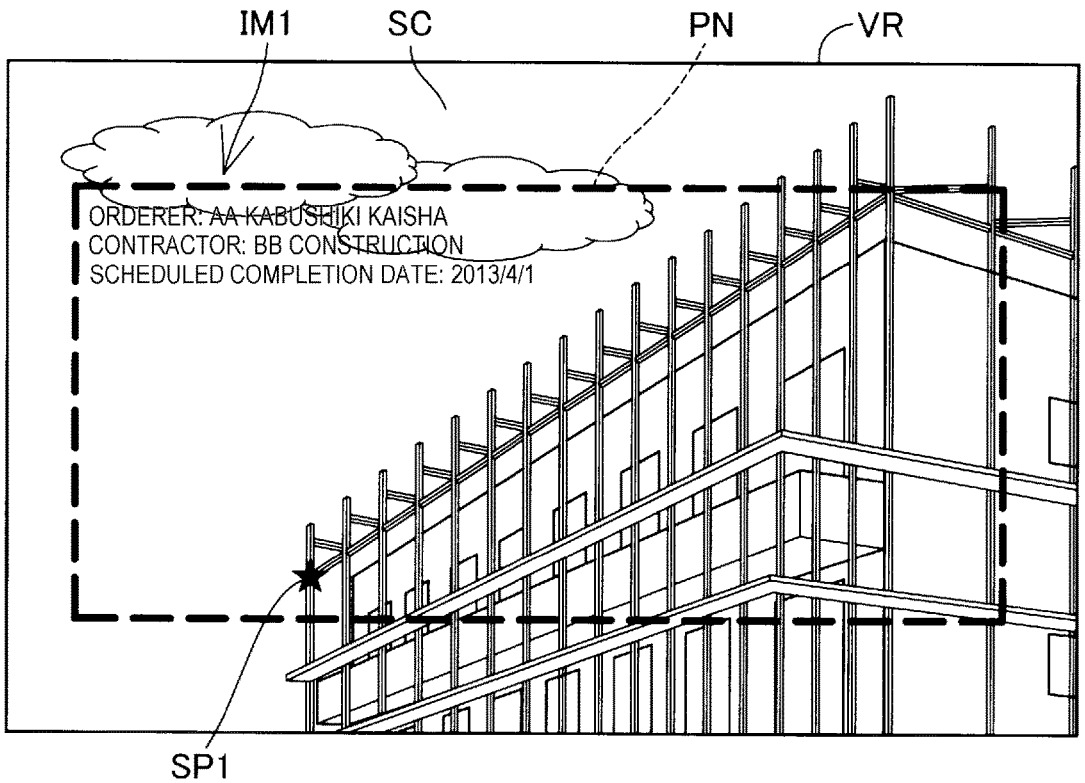

[Fig. 9]
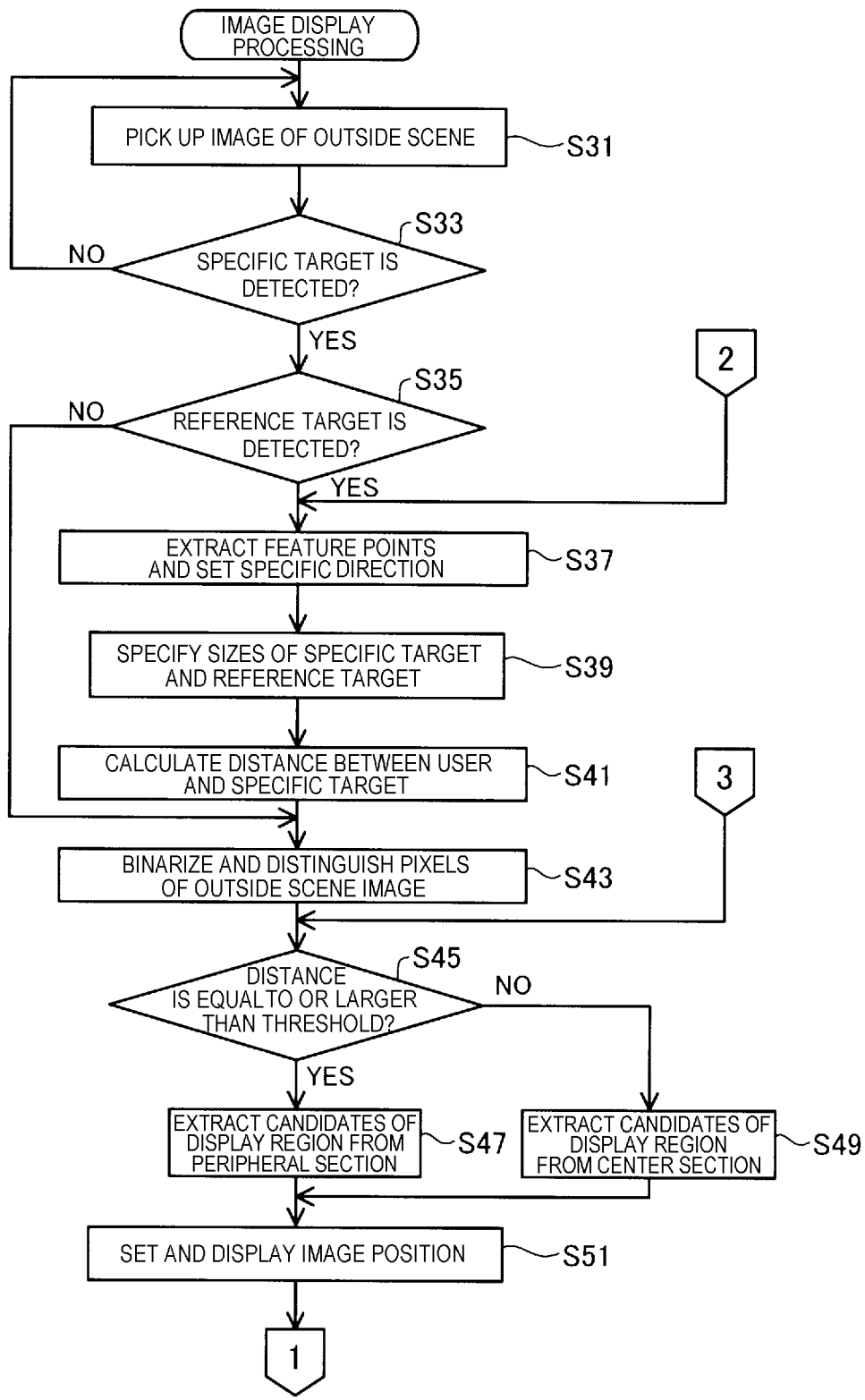

[Fig. 10]
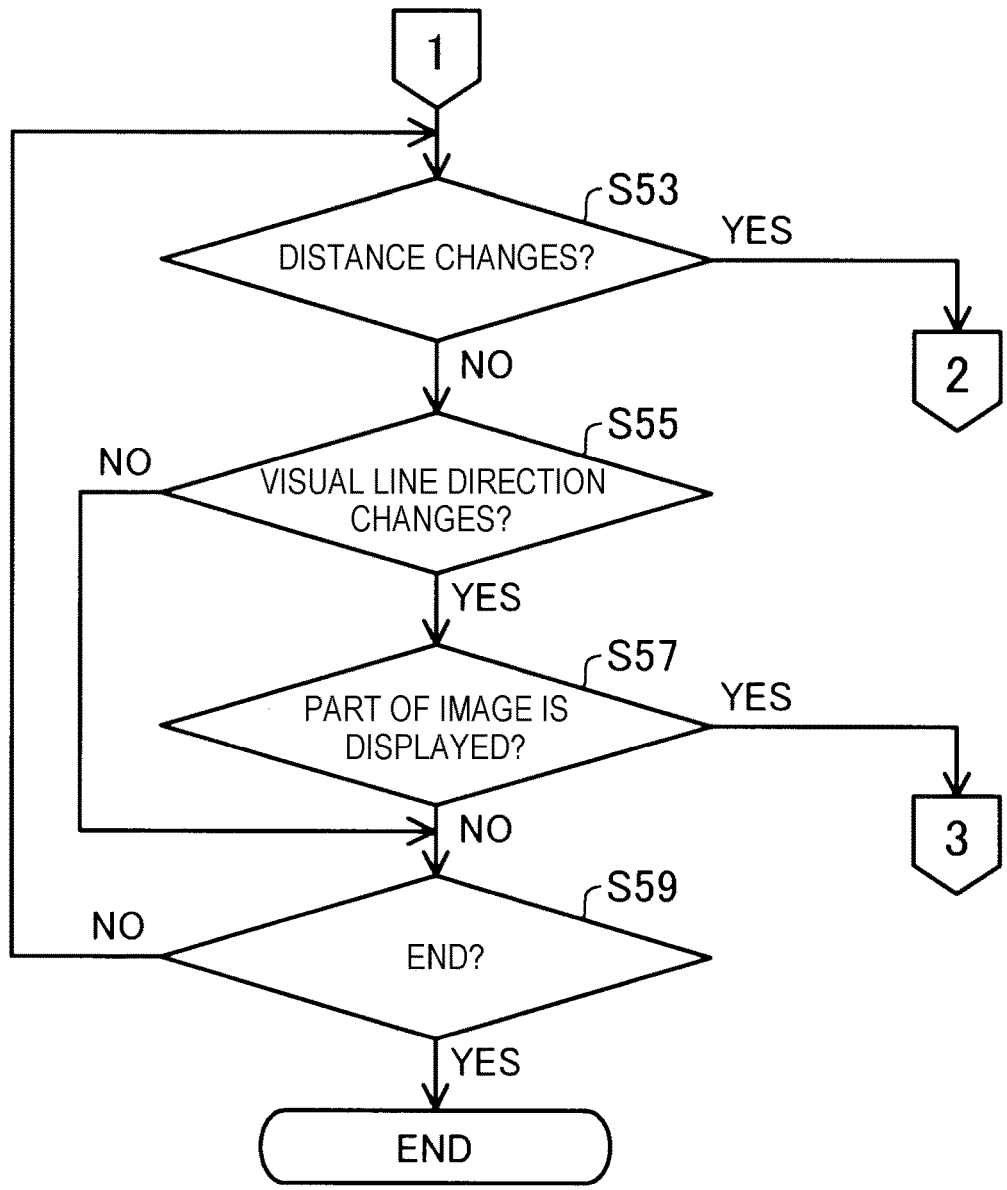

[Fig. 11]
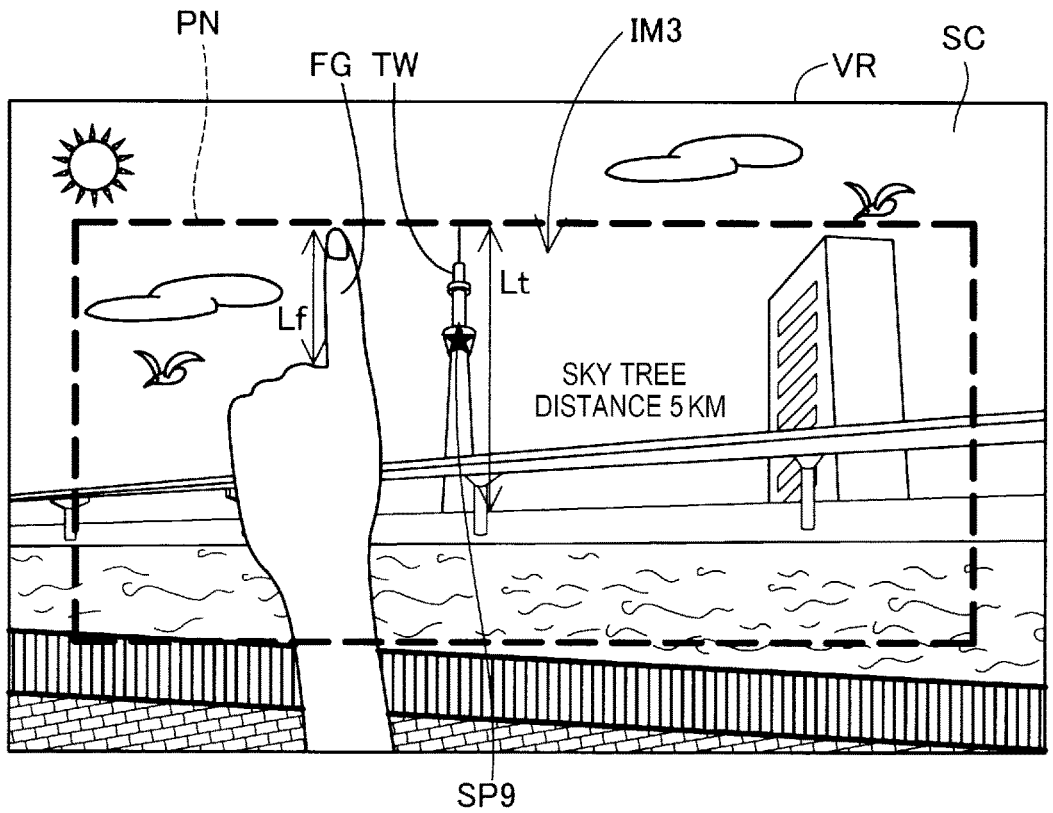
[Fig. 12]
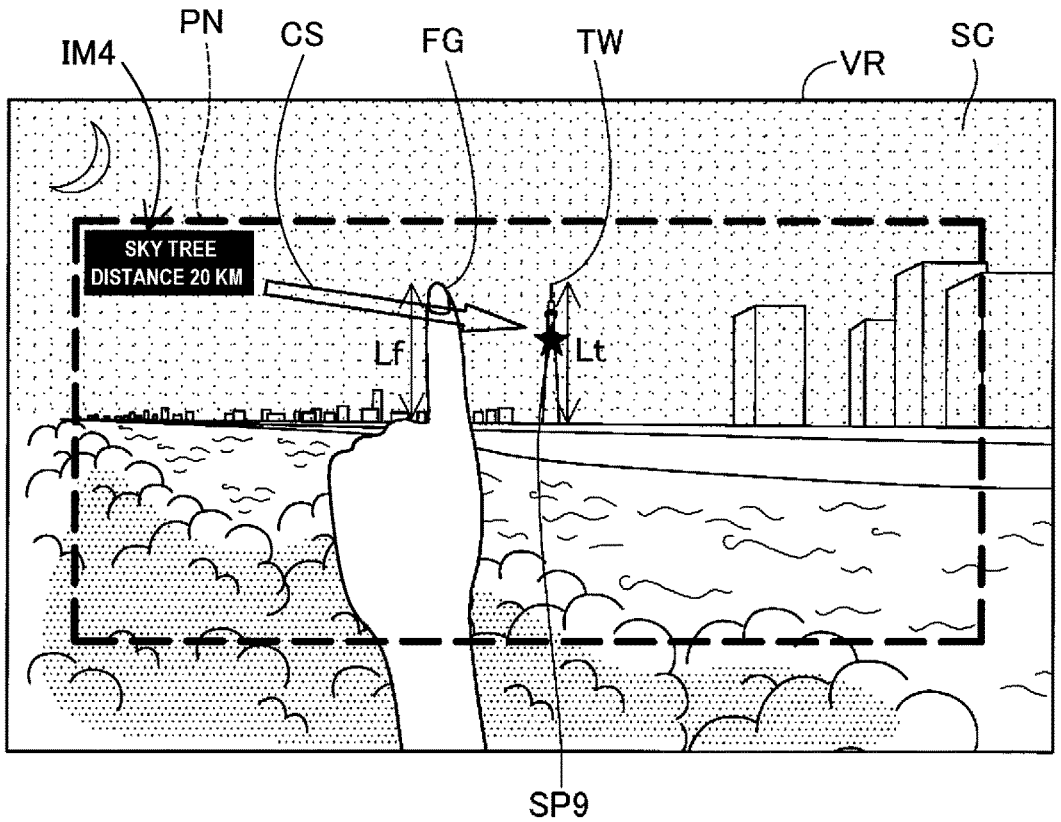

[Fig. 13]
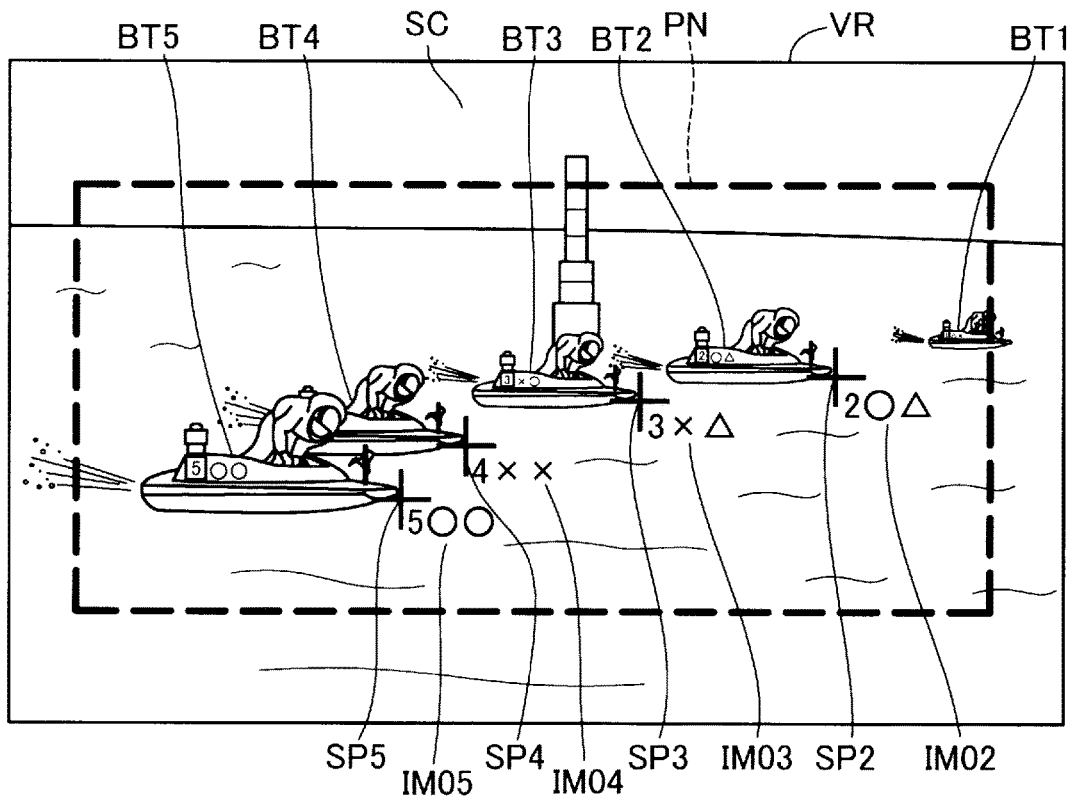
[Fig. 14]
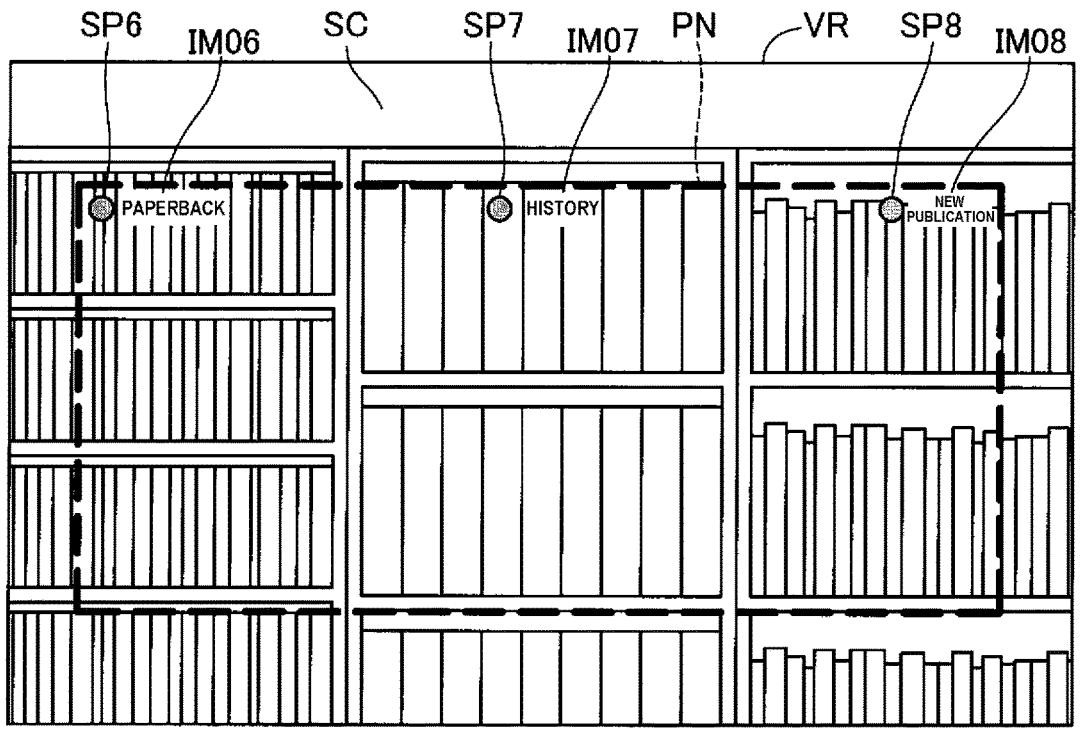

[Fig. 15A]
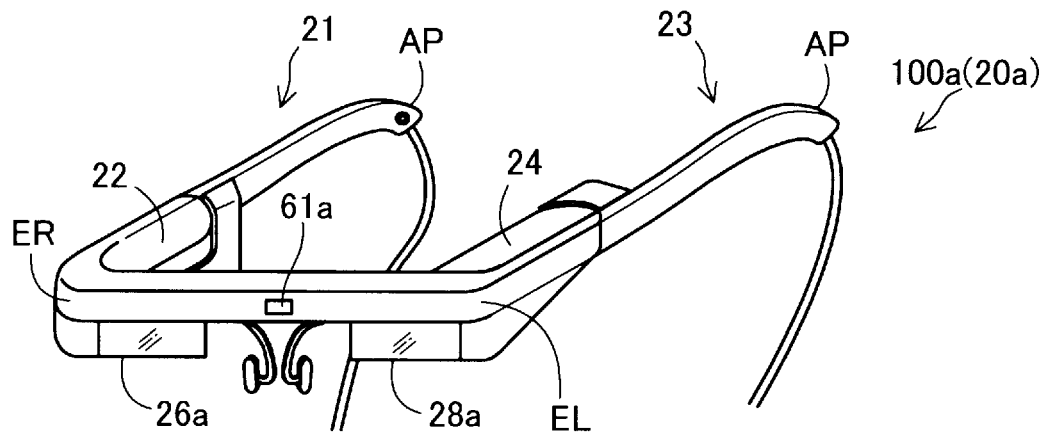
[Fig. 15B]
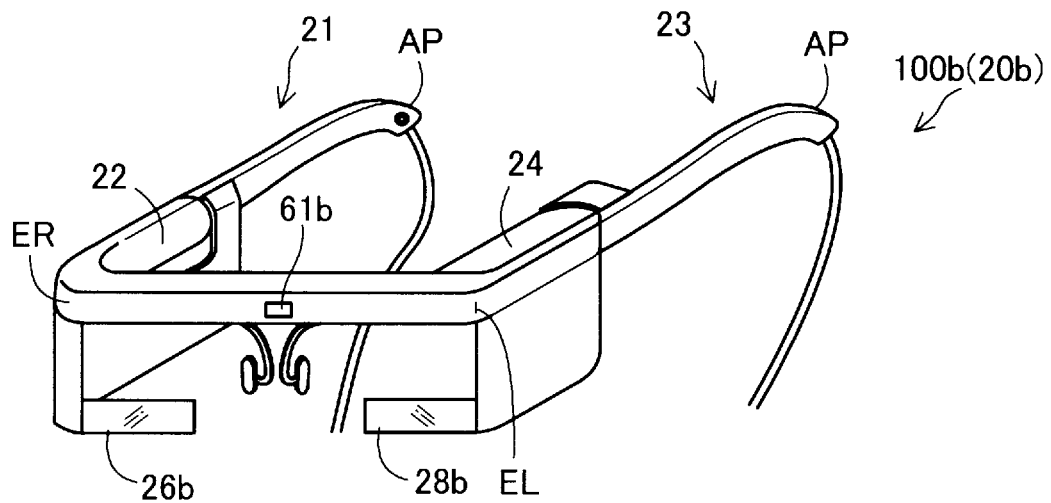

HEAD MOUNTED DISPLAY DEVICE AND CONTROL METHOD FOR HEAD MOUNTED DISPLAY DEVICE

TECHNICAL FIELD

The present invention relates to a head mounted display device.

BACKGROUND ART

A head mounted display device (a head mounted display; HMD), which is a display device mounted on the head, is known. For example, the head mounted display device generates, using a liquid crystal display and a light source, image light representing an image and guides the generated image light to the eyes of a user using a projection optical system and a light guide plate to thereby cause the user to visually recognize a virtual image. As the head mounted display device, there are two types: a transmission type for enabling the user to visually recognize an outside scene in addition to the virtual image and a non-transmission type for disabling the user to visually recognize the outside scene. As the head mounted display device of the transmission type, there are an optical transmission type and a video transmission type.

PTL 1 discloses a technique for analyzing a tilt of the head of a user of a head mounted display device to calculate a tilt of the head mounted display device with respect to the horizontal plane, analyzing a movement of a predetermined part (e.g., an arm) of the user to calculate a movement amount of the user in a predetermined time, and, when the movement amount is equal to or larger than a predetermined value, gradually tilting a video in a continuous plurality of frames to correct the tilt of the head mounted display device and suppress visually induced motion sickness caused by a shift between an outside scene and the video visually recognized by the user. PTL 2 discloses a technique for causing, in a region of a video that a head mounted display device causes a user to visually recognize, a peripheral section of the video, which considerably affects visually induced motion sickness, to emit light to suppress the visually induced motion sickness of the user.

CITATION LIST

Patent Literature

PTL 1: JP-A-2012-109708
PTL 2: U.S. Pat. No. 8,212,859

Non Patent Literature

NPL 1: Research Report concerning the Influence of Contents on the Living Organism, March 2004, Ministry of Internal Affairs and Communications
NPL 2: Guideline by Video Method such as Animation, 2006, Japan Broadcasting Corporation, National Association of Commercial Broadcasters in Japan

SUMMARY OF INVENTION

Technical Problem

However, in the technique described in PTL 1, only when the head mounted display device tilts with respect to the horizontal plane and the movement amount of the user is equal to or larger than the predetermined value, the video visually recognized by the user is corrected. For example, when the user is walking and the head mounted display device does not tilt with respect to the horizontal lane, the video is not corrected. Therefore, it is desired to suppress the visually induced motion sickness of the user irrespective of whether the head mounted display device tilts with respect to the horizontal plane. In the technique described in PTL 2, although the visually induced motion sickness of the user can be suppressed, the user feels it difficult to visually recognize the outside scene in the light emitting region. Therefore, it is desired to improve visibility of the outside scene visually recognized by the user while suppressing the visually induced motion sickness. Further, it is desired to control, according to information included in the outside scene, the video that the head mounted display device causes the user to visually recognize. Besides, in the head mounted display device in the past, improvement of convenience and the like are desired.

Solution to Problem

An advantage of some aspects of the invention is to solve at least a part of the problems described above, and the invention can be implemented as the following aspects.

(1) An aspect of the invention provides a transmission type head mounted display device. The head mounted display device includes: an image display unit including an image-light generating unit configured to generate image light on the basis of image data and emit the image light, the image display unit causing a user to visually recognize the image light as a virtual image and transmitting an outside scene in a state in which the image display unit is worn on the head of the user; a display-unit-direction specifying unit configured to specify a display unit direction, which is a direction of the image display unit; a specific-direction setting unit configured to set a specific direction on the basis of an image light generation region where the image-light generating unit generates the image light and the display unit direction; and a control unit configured to set a position of the image light generation region on the basis of the display unit direction such that the image light generation region and the specific direction are aligned after the specific direction is set. With the head mounted display device according to this aspect, the image light generation region is aligned with the outside scene. Therefore, the image light is visually recognized by the user integrally with the outside scene. Even when the user moves, since there is no shift between the outside scene and the image light, it is possible to suppress visually induced motion sickness of the user.

(2) The head mounted display device according to the aspect described above may be configured such that the head mounted display device further includes an image pickup unit configured to pickup an image of the outside scene, and the specific-direction setting unit discriminates a specific target included in the picked-up image and set the specific direction on the basis of the specific target. With the head mounted display device according to this aspect, the specific direction is set according to the discriminated specific target. Therefore, image light more suitable for the outside scene visually recognized by the user is visually recognized by the user via the image display unit and convenience for the user is improved.

(3) The head mounted display device according to the aspect described above may be configured such that the head mounted display device further includes: a first target storing unit configured to store a size of the specific target; and a distance specifying unit configured to specify a distance between the image display unit and the specific target on the basis of a focal length of the image pickup unit and a size of an image of the specific target, and the control unit sets the image light on the basis of the specified distance. With the head mounted display device according to this aspect, the image light that the head mounted display device causes the user to visually recognize is set according to the distance between the user of the head mounted display device and the specific target calculated according to the focal length of the image pickup unit and the size of the specific target. Consequently, it is possible to cause the user to visually recognize image light corresponding to a situation of the user and convenience for the user is improved.

(4) The head mounted display device according to the aspect described above may be configured such that the head mounted display device further includes: a second target storing unit configured to store a size of the specific target and a size of a distance reference target different from the specific target; and a distance specifying unit configured to discriminate the distance reference target included in the picked-up image and specify a distance between the image display unit and the specific target on the basis of a size of an image of the specific target and a size of an image of the distance reference target, and the control unit sets the image light on the basis of the specified distance. With the head mounted display device according to this aspect, the image light that the head mounted display device causes the user to visually recognize is set according to the distance between the user of the head mounted display device and the specific target calculated according to the size of the specific target and the size of the distance reference target. Consequently, it is possible to cause the user to visually recognize image light corresponding to a situation of the user and convenience for the user is improved.

(5) The head mounted display device according to the aspect described above may be configured such that the control unit sets, when the specified distance is equal to or larger than a threshold, the image light including an object in a portion other than a center portion in a region where the image display unit can generate the image light and the image light indicating a positional relation between the image light including the object in the region where the image display unit can generate the image light and the specific target included in the picked-up image and sets, when the specified distance is smaller than the threshold, the image light including the object in the center portion in the region where the image display unit can generate the image light. With the head mounted display device according to this aspect, image light that the head mounted display device causes the user to visually recognize is different depending on the distance between the user and the specific target. Therefore, the user can recognize the distance to the specific target using the image light visually recognized by the user and convenience for the user is improved.

(6) The head mounted display device according to the aspect described above may be configured such that the head mounted display device further includes: a display-unit-position specifying unit configured to specify a position of the image display unit; and a position-information receiving unit configured to receive information for specifying a position of the specific target, and the control unit sets the image light on the basis of a positional relation between the image display unit and the specific target. With the head mounted display device according to this aspect, image light visually recognized by the user via the image display unit is set according to the positional relation between the image display unit and the specific target. Therefore, the user can more easily visually recognize the positional relation with the specific target and convenience for the user is further improved.

(7) The head mounted display device according to the aspect described above may be configured such that the control unit sets an object included in the image light to be larger as a distance from the position of the image display unit to the position of the specific target object is shorter. With the head mounted display device according to this aspect, a size of an object included in image light visually recognized by the user via the image display unit is larger as the distance between the user and the specific object is shorter. Therefore, the user can more easily visually recognize a positional relation with the specific target and convenience for the user is further improved.

(8) The head mounted display device according to the aspect described above may be configured such that the control unit sets the image light on the basis of a color of pixels in a portion other than an image of the specific target in the picked-up image. With the head mounted display device according to this aspect, image light visually recognized by the user is not mixed in the outside scene and is clearly visually recognized by the user. Therefore, it is easier to cause the user to recognize the image light and convenience for the user is improved.

(9) The head mounted display device according to the aspect described above may be configured such that the control unit sets the image light such that a color of pixels forming an object included in the image light is a color complementary to the color of the pixels of the portion other than the image of the specific target. With the head mounted display device according to this aspect, image light visually recognized by the user is not mixed in the outside scene and clearly visually recognized by the user. Therefore, it is easier to cause the user to recognize the image light and convenience for the user is improved.

(10) The head mounted display device according to the aspect described above may be configured such that the control unit sets luminance of the image light on the basis of luminance of the picked-up image. With the head mounted display device according to this aspect, luminance of the image display unit is set according to the luminance of the picked-up image. Therefore, even if image data is the same, it is possible to further improve visibility of the user for image light visually recognized by the user via the image display unit.

(11) The head mounted display device according to the aspect described above may be configured such that the control unit sets the luminance of the image light higher as the luminance of the picked-up image is higher. With the head mounted display device according to this aspect, the luminance of the image display unit is set low when the luminance of the picked-up image is low. Therefore, it is possible to increase an operating time of the head mounted display device without using unnecessary electric power.

(12) The head mounted display device according to the aspect described above may be configured such that the head mounted display device further includes a movement specifying unit configured to specify a movement of the image display unit, and the control unit sets a position of the image light generation region on the basis of a moving state of the user specified on the basis of the movement of the image display unit. With the head mounted display device according to this aspect, a relative movement of image light, which the head mounted display device causes the user to visually recognize, due to the moving state of the user is offset.

Therefore, it is possible to suppress visually induced motion sickness of the user.

(13) The head mounted display device according to the aspect described above may be configured such that the control unit sets time for changing the image light from a state in which the image light is not visually recognized by the user to a state in which the image light is visually recognized by the user and time for changing the image light from the state in which the image light is visually recognized by the user to the state in which the image light is not visually recognized by the user in a relation in which at least one of the times monotonously increases with respect to speed of the movement of the image display unit. With the head mounted display device according to this aspect, when a movement of the user is fast, at least one of the time for changing the image light from the state in which the image light is not visually recognized by the user to the state in which the image light is visually recognized by the user and the time for changing the image light from the state in which the image light is visually recognized by the user to the state in which the image light is not visually recognized by the user is set long. Therefore, it is possible to reduce a change of image light in a visual field of the user and further suppress visually induced motion sickness of the user.

Not all of a plurality of components of the aspects of the invention explained above are essential. To solve a part or all of the problems or to attain a part or all of the effects described in this specification, concerning a part of the plurality of components, it is possible to perform, as appropriate, change, deletion, replacement with new other components, and deletion of a part of limited contents. To solve a part or all of the problems or to attain a part or all of the effects described in this specification, it is also possible to combine a part or all of technical features included in one aspect of the invention with a part or all of technical features included in the other aspects of the invention to form independent one aspect of the invention.

For example, one aspect of the invention can be realized as a device including at least one or more or all of the image display unit, the display-unit-direction specifying unit, the specific-direction setting unit, and the control unit. That is, the device may include or may not include the image display unit. The device may include or may not include the display-unit-direction specifying unit. The device may include or may not include the specific-direction setting unit. The device may include or may not include the control unit. The image display unit may include, for example, an image-light generating unit configured to generate image light on the basis of image data and emit the image light. The image display unit may cause a user to visually recognize the image light as a virtual image and may transmit an outside scene in a state in which the image display unit is worn on the head of the user. The display-unit-direction specifying unit may specify, for example, a display unit direction, which is a direction of the image display unit. The specific-direction setting unit may set, for example, a specific direction on the basis of an image light generation region where the image-light generating unit generates the image light and the display unit direction. The control unit may set, for example, a position of the image light generation region on the basis of the display unit direction such that the image light generation region and the specific direction are aligned after the specific direction is set. The device can be realized as, for example, a head mounted display device and can also be realized as devices other than the head mounted display device. According to such an aspect, it is possible to attain at least one of various objects such as improvement of operability and simplification of the device, integration of the device, and improvement of convenience for the user who uses the device. A part or all of the technical features of the aspects of the head mounted display device explained above can be applied to the device.

The invention can be realized in various forms other than the head mounted display device. The invention can be realized in forms such as a display device, a control method for the head mounted display device and the display device, a head mounted display system, a computer program for realizing functions of the head mounted display device, the display device, and the head mounted display system, a recording medium having recorded therein the computer program, and a data signal including the computer program and embodied in a carrier wave.

BRIEF DESCRIPTION OF DRAWINGS

FIG. 1 is an explanatory diagram showing the external configuration of a head mounted display device.

FIG. 2 is a block diagram schematically showing the configuration of the head mounted display device.

FIG. 3 is an explanatory diagram showing a state in which image light is emitted by an image-light generating unit.

FIG. 4 is an explanatory diagram showing a flow of image display processing.

FIG. 5 is an explanatory diagram showing an example of a visual field visually recognized by a user.

FIG. 6 is an explanatory diagram showing an example of a displayed image visually recognized by the user.

FIG. 7 is an explanatory diagram showing an example of a visual field visually recognized by the user.

FIG. 8 is an explanatory diagram showing an example of the visual field visually recognized by the user in a comparative example.

FIG. 9 is an explanatory diagram showing a flow of image display processing in a second embodiment.

FIG. 10 is an explanatory diagram showing the flow of the image display processing in the second embodiment.

FIG. 11 is an explanatory diagram showing an example of a visual field visually recognized by a user.

FIG. 12 is an explanatory diagram showing an example of a visual field visually recognized by the user.

FIG. 13 is an explanatory diagram showing an example of a visual field visually recognized by a user in a modification.

FIG. 14 is an explanatory diagram showing an example of a visual field visually recognized by a user in the modification.

FIG. 15A is an explanatory diagram showing the external configuration of a head mounted display device in the modification.

FIG. 15B is an explanatory diagram showing the external configuration of a head mounted display device in the modification.

DESCRIPTION OF EMBODIMENTS

Embodiments of the invention are explained in order described below.
A. First Embodiment
A-1. Configuration of a head mounted display device
A-2. Image display processing
B. Comparative example
C. Second Embodiment
D. Modifications

A. First Embodiment

A-1. Configuration of a Head Mounted Display Device

FIG. 1 is an explanatory diagram showing the external configuration of a head mounted display device 100. The head mounted display device 100 is a display device mounted on the head and is also called head mounted display (HMD). The head mounted display device 100 in this embodiment is an optical transmission type head mounted display device for enabling a user to visually recognize a virtual image and, at the same time, directly visually recognize an outside scene. In this specification, the virtual image visually recognized by the user using the head mounted display device 100 is also referred to as "displayed image" for convenience. Emitting image light generated on the basis of image data is referred to as "display an image".

The head mounted display device 100 includes an image display unit 20 configured to cause a user to visually recognize a virtual image in a state in which the image display unit 20 is worn on the head of the user and a control unit 10 (a controller 10) configured to control the image display unit 20.

The image display unit 20 is a wearing body worn on the head of the user and has an eyeglass shape in this embodiment. The image display unit 20 includes a right holding unit 21, a right display driving unit 22, a left holding unit 23, a left display driving unit 24, a right optical-image display unit 26, a left optical-image display unit 28, and a camera 61. The right optical-image display unit 26 and the left optical-image display unit 28 are respectively arranged to be located in front of the right and left eyes of the user when the user wears the image display unit 20. One end of the right optical-image display unit 26 and one end of the left optical-image display unit 28 are connected to each other in a position corresponding to the middle of the forehead of the user when the user wears the image display unit 20.

The right holding unit 21 is a member provided to extend from an end ER, which is the other end of the right optical-image display unit 26, to a position corresponding to the temporal region of the user when the user wears the image display unit 20. Similarly, the left holding unit 23 is a member provided to extend from an end EL, which is the other end of the left optical-image display unit 28, to a position corresponding to the temporal region of the user when the user wears the image display unit 20. The right holding unit 21 and the left holding unit 23 hold the image display unit 20 on the head of the user in the same manner as temples of eyeglasses.

The right display driving unit 22 and the left display driving unit 24 are arranged on sides opposed to the head of the user when the user wears the image display unit 20. In the following explanation, the right holding unit 21 and the left holding unit 23 are generally simply referred to as "holding unit" as well. The right display driving unit 22 and the left display driving unit 24 are generally simply referred to as "display driving unit" as well. The right optical-image display unit 26 and the left optical-image display unit 28 are generally simply referred to as "optical-image display unit" as well.

The display driving units 22 and 24 include liquid crystal displays 241 and 242 (hereinafter referred to as "LCDs 241 and 242") and projection optical systems 251 and 252 (see FIG. 2). Details of the configuration of the display driving units 22 and 24 are explained below. The optical-image display units 26 and 28 functioning as optical members include light guide plates 261 and 262 (see FIG. 2) and dimming plates. The light guide plates 261 and 262 are formed of a light transmissive resin material or the like and guide image lights output from the display driving units 22 and 24 to the eyes of the user. The dimming plates are thin plate-like optical elements and arranged to cover the front side of the image display unit 20, which is a side opposite to the eye side of the user. The dimming plates protect the light guide plates 261 and 262 and suppress damage, adhesion of stain, and the like to the light guide plates 261 and 262. By adjusting the light transmittance of the dimming plates, it is possible to adjust an amount of external light entering the eyes of the user and adjust easiness of visual recognition of a virtual image. Note that the dimming plates can be omitted.

The camera 61 is arranged in a position corresponding to the middle of the forehead of the user when the user wears the image display unit 20. The camera 61 picks up an image of an outside scene, which is a scene on the outside of a visual line direction of the user, and acquires an outside scene image in a state in which the user wears the image display unit 20 on the head. The camera 61 is a monocular camera but may be a stereo camera. The camera 61 is equivalent to an image pickup unit in the appended claims.

The image display unit 20 further includes a connecting unit 40 for connecting the image display unit 20 to the control unit 10. The connecting unit 40 includes a main body cord 48 connected to the control unit 10, a right cord 42 and a left cord 44, and a coupling member 46. The right cord 42 and the left cord 44 are two cords branching from the main body cord 48. The right cord 42 is inserted into a housing of the right holding unit 21 from a distal end portion AP in an extending direction of the right holding unit 21 and connected to the right display driving unit 22. Similarly, the left cord 44 is inserted into a housing of the left holding unit 23 from a distal end portion AP in an extending direction of the left holding unit 23 and connected to the left display driving unit 24. The coupling member 46 is provided at a branching point of the main body cord 48 and the right and left cords 42 and 44. The coupling member 46 includes a jack for connecting an earphone plug 30. A right earphone 32 and a left earphone 34 extend from the earphone plug 30.

The image display unit 20 and the control unit 10 perform transmission of various signals via the connecting unit 40. Connectors (not shown in the figure), which fit with each other, are respectively provided at an end of the main body cord 48 on the opposite side of the coupling member 46 and in the control unit 10. The control unit 10 and the image display unit 20 are connected and disconnected according to fitting and unfitting of the connector of the main body cord 48 and the connector of the control unit 10. For example, a metal cable or an optical fiber can be adopted as the right cord 42, the left cord 44, and the main body cord 48.

The control unit 10 is a device for controlling the head mounted display device 100. The control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining content of operation by the control unit 10. The lighting unit 12 notifies, with a light emission state thereof, an operation state of the head mounted display device 100. As the operation state of the head mounted display device 100, for example, there is ON/OFF of a power supply. As the lighting unit 12, for example, an LED (Light Emitting Diode) is used. The display switching key 13 detects pressing operation and outputs, for example, a signal for switching a display mode of a content moving image to 3D and 2D. The track pad 14 detects operation by a finger of the user on an operation surface of the track pad 14 and outputs a signal corresponding to detected content. As the track pad 14, various track pads such as an electrostatic type, a pressure detection type, and an optical type can be adopted. The luminance switching key 15 detects pressing operation and outputs a signal for increasing and decreasing the luminance of the image display unit 20. The direction key 16 detects pressing operation for keys corresponding to up, down, left, and right directions and outputs a signal corresponding to detected content. The power switch 18 detects slide operation of the switch to switch a state of a power supply of the head mounted display device 100.

FIG. 2 is a block diagram functionally showing the configuration of the head mounted display device 100. As shown in FIG. 2, the control unit 10 includes an input-information acquiring unit 110, a storing unit 120, a power supply 130, an operation unit 135, a CPU 140, an interface 180, a transmitting unit 51 (Tx 51) and a transmitting unit 52 (Tx 52), a GPS module 134, and a radio communication unit 132. The operation unit 135 receives operation by the user. The operation unit 135 is configured by the determination key 11, the display switching key 13, the track pad 14, the luminance switching key 15, the direction key 16, the menu key 17, and the power switch 18.

The input-information acquiring unit 110 acquires a signal corresponding to an operation input by the user. As the signal corresponding to the operation input, for example, there are operation inputs to the track pad 14, the direction key 16, and the power switch 18 arranged on the operation unit 135. The power supply 130 supplies electric power to the units of the head mounted display device 100. As the power supply 130, for example, a secondary battery can be used. The storing unit 120 has stored therein various computer programs. The storing unit 120 is configured by a ROM, a RAM, and the like.

The GPS module 134 receives a signal from a GPS satellite to thereby specify the present position of the image display unit 20 and generates information indicating the position. Since the present position of the image display unit 20 is specified, the present position of the user of the head mounted display device 100 is specified. The radio communication unit 132 performs radio communication with other apparatuses according to a predetermined radio communication standard such as a wireless LAN or Bluetooth. The radio communication unit 132 can receive, for example, position information of a building by performing radio communication. The GPS module 134 is equivalent to a display-unit-position specifying unit in the appended claims. The radio communication unit 132 is equivalent to a position-information receiving unit in the appended claims.

The CPU 140 reads out and executes the computer programs stored in the storing unit 120 to thereby function as an operating system 150 (OS 150), a display control unit 190, a sound processing unit 170, an image processing unit 160, a direction determining unit 166, an image-position control unit 165, and an image determining unit 168.

The display control unit 190 generates control signals for controlling the right display driving unit 22 and the left display driving unit 24. Specifically, the display control unit 190 individually controls, using the control signals, ON/OFF of driving of the right LCD 241 by a right LCD control unit 211, ON/OFF of driving of a right backlight 221 by a right backlight control unit 201, ON/OFF of driving of the left LCD 242 by a left LCD control unit 212, and ON/OFF of driving of a left backlight 222 by a left backlight control unit 202. Consequently, the display control unit 190 controls generation and emission of image lights by the right display driving unit 22 and the left display driving unit 24. For example, the display control unit 190 causes both of the right display driving unit 22 and the left display driving unit 24 to generate image lights, causes only one of the right display driving unit 22 and the left display driving unit 24 to generate image light, or causes both of the right display driving unit 22 and the left display driving unit 24 not to generate image light.

The display control unit 190 transmits the control signals to the right LCD control unit 211 and the left LCD control unit 212 respectively via the transmitting units 51 and 52. The display control unit 190 transmits the control signals respectively to the right backlight control unit 201 and the left backlight control unit 202.

The image processing unit 160 acquires an image signal included in contents. The image processing unit 160 separates synchronization signals such as a vertical synchronization signal VSync and a horizontal synchronization signal HSync from the acquired image signal. The image processing unit 160 generates a clock signal PCLK using a PLL (Phase Locked Loop) circuit or the like (not shown in the figure) according to cycles of the separated vertical synchronization signal VSync and horizontal synchronization signal HSync. The image processing unit 160 converts the analog image signal, from which the synchronization signals are separated, into a digital image signal using an A/D conversion circuit or the like (not shown in the figure). Thereafter, the image processing unit 160 stores the digital image signal after the conversion in a DRAM in the storing unit 120 frame by frame as image data (RGB data) of a target image. The image processing unit 160 may execute image processing such as resolution conversion processing, various kinds of tone correction processing for adjustment of luminance and chroma, and keystone correction processing on the image data.

The image processing unit 160 transmits the clock signal PCLK, the vertical synchronization signal VSync, and the horizontal synchronization signal HSync generated by the image processing unit 160 and the image data stored in the DRAM in the storing unit 120 respectively via the transmitting units 51 and 52. The transmitting units 51 and 52 function as a transceiver for serial transmission between the control unit 10 and the image display unit 20.

The sound processing unit 170 acquires a sound signal included in the contents, amplifies the acquired sound signal, and supplies the amplified sound signal to a speaker (not shown) in the right earphone 32 and a speaker (not shown) in the left earphone 34 connected to the coupling member 46. For example, when a Dolby (registered trademark) system is adopted, processing for the sound signal is performed. Different sounds, the frequencies or the like of which are varied, are respectively output from the right earphone 32 and the left earphone 34.

The direction determining unit 166 determines a direction and a movement of the image display unit 20 detected by a 9-axis sensor 66 explained below. The direction determining unit 166 determines the direction of the image display unit 20 to estimate a direction of the head of the user. The image determining unit 168 determines, through pattern matching, whether a specific target same as image data of a specific target stored in advance in the storing unit 120 is included in an outside scene image. When the specific target is included in the outside scene image, the image determining unit 168 collates the specific target with data stored in the storing unit 120 and extracts a feature point set in advance in the specific target. The image determining unit 168 sets, as a specific direction, a direction from the user to the feature point. The image determining unit 168 is equivalent to a specific-direction setting unit in the appended claims.

When the specific target is included in the outside scene image, the image-position control unit 165 causes the image display unit 20 to display, with reference to the specific direction set by the image determining unit 168, an image representing image data set in association with the specific target. The image data set in association with the specific target is a name, position information, and the like of the specific target. As explained in detail below, when the specific direction is set, the image-position control unit 165 sets a position of a displayed image such that the specific direction and the displayed image are aligned according to a change in the direction of the image display unit 20. The image-position control unit 165 creates, according to a color (RGB values) of the outside scene image, on the basis of the image data, image data in which the RGB values are changed. The image-position control unit 165 changes the luminance of the image display unit 20 according to the luminance of the outside scene image to generate different images on the basis of the same image data. For example, the image-position control unit 165 creates image data in which characters included therein are larger as the distance from the user to the specific target is shorter and sets the luminance of the image display unit 20 lower as the luminance of the outside scene image is lower. The image-position control unit 165 is equivalent to a control unit in the appended claims. The characters included in the image data are equivalent to an object in the appended claims.

The interface 180 is an interface for connecting various external apparatuses OA, which are supply sources of contents, to the control unit 10. Examples of the external apparatuses OA include a personal computer PC, a cellular phone terminal, and a game terminal. As the interface 180, for example, a USB interface, a micro USB interface, or an interface for a memory card can be used.

The image display unit 20 includes the right display driving unit 22, the left display driving unit 24, the right light guide plate 261 functioning as the right optical-image display unit 26, the left light guide plate 262 functioning as the left optical-image display unit 28, the 9-axis sensor 66, and the camera 61.

The 9-axis sensor 66 is a motion sensor configured to detect acceleration (three axes), angular velocity (three axes), and terrestrial magnetism (three axes). Since the 9-axis sensor 66 is provided in the image display unit 20, when the image display unit 20 is worn on the head of the user, the 9-axis sensor 66 detects a movement of the head of the user. A direction of the image display unit 20 is specified from the detected movement of the head of the user. The 9-axis sensor 66 and the direction determining unit 166 are equivalent to a display-unit-direction specifying unit in the appended claims.

The right display driving unit 22 includes a receiving unit 53 (Rx 53), the right backlight control unit 201 (right BL control unit 201) and the right backlight 221 (right BL 221) functioning as a light source, the right LCD control unit 211 and the right LCD 241 functioning as a display element, and the right projection optical system 251. The right backlight control unit 201 and the right backlight 221 function as the light source. The right LCD control unit 211 and the right LCD 241 function as the display element. The right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is, for example, a light emitting body such as an LED or an electroluminescence (EL). The right LCD control unit 211 drives the right LCD 241 on the basis of the clock signal PCLK, the vertical synchronization signal VSync, the horizontal synchronization signal HSync, and the image data for right eye input via the receiving unit 53. The right LCD 241 is a transmissive liquid crystal panel on which a plurality of pixels are arranged in a matrix shape.

The right projection optical system 251 is configured by a collimate lens that changes the image light emitted from the right LCD 241 to light beams in a parallel state. The right light guide plate 261 functioning as the right optical-image display unit 26 guides the image light output from the right projection optical system 251 to a right eye RE of the user while reflecting the image light along a predetermined optical path. The right projection optical system 251 and the right light guide plate 261 are collectively referred to as "light guide unit" as well.

The left display driving unit 24 includes a configuration same as the configuration of the right display driving unit 22. The left display driving unit 24 includes a receiving unit 54 (Rx 54), the left backlight control unit 202 (left BL control unit 202) and the left backlight 222 (left BL 222) functioning as a light source, the left LCD control unit 212 and the left LCD 242 functioning as a display element, and the left projection optical system 252. The left backlight control unit 202 and the left backlight 222 function as the light source. The left LCD control unit 212 and the left LCD 242 function as the display element. The left backlight control unit 202, the left LCD control unit 212, the left backlight 222, and the left LCD 242 are collectively referred to as "image-light generating unit" as well. The left projection optical system 252 is configured by a collimate lens that changes the image light emitted from the left LCD 242 to light beams in a parallel state. The left light guide plate 262 functioning as the left optical-image display unit 28 guides the image light output from the left projection optical system 252 to a left eye LE of the user while reflecting the image light along a predetermined optical path. The left projection optical system 252 and the left light guide plate 262 are collectively referred to as "light guide unit" as well.

FIG. 3 is an explanatory diagram showing a state in which image light is emitted by the image-light generating unit. The right LCD 241 drives liquid crystals in the positions of the pixels arranged in the matrix shape to thereby change the transmittance of light transmitted through the right LCD 241 to modulate illumination light IL irradiated from the right backlight 221 to effective image light PL representing an image. The same applies to the left side. Although the backlight system is adopted in this embodiment as shown in FIG. 3, the image light may be emitted using a front light system or a reflection system.

A-2. Image Display Processing

FIG. 4 is an explanatory diagram showing a flow of image display processing. In the image display processing, when the specific target is included in the outside scene image, the position of the displayed image is changed and the displayed image is displayed on the image display unit 20 such that alignment for fixing a positional relation between the specific direction and the displayed image is performed even if the visual line direction of the user changes.

When predetermined operation for starting the image display processing is received, first, the camera 61 picks up an image of an outside scene (step S11). Subsequently, the image determining unit 168 determines whether a specific building serving as a specific target stored in the storing unit 120 as a detection target is included in the picked-up outside scene image (step S12). When it is determined that the specific target is not included in the outside scene image (step S12: NO), the camera 61 picks up an image of the outside scene again (step S11). The image determining unit 168 determines whether the specific target is included in the picked-up outside scene image (step S12).

When it is determined that the specific target is included in the outside scene image (step S12: YES), the image determining unit 168 extracts a feature point of the specific building. The direction determining unit 166 sets a specific direction from the user to the feature point (step S13). FIG. 5 is an explanatory diagram showing an example of a visual field VR visually recognized by the user. As shown in FIG. 5, an outside scene SC transmitted through the optical-image display units 26 and 28 of the image display unit 20 is visually recognized by the user. The outside scene SC includes a building BL under construction as the specific target. When the image determining unit 168 recognizes the building BL, the image determining unit 168 collates the building BL with data of the building BL stored in the storing unit 120 to extract a feature point SP1 at a corner of the building BL as the feature point. The direction determining unit 166 sets, as the specific direction, a direction from the user to the extracted feature point SP1. A largest region in which the image display unit 20 can display an image is an image display largest region PN and indicated by a broken line. The image display largest region PN and the feature point SP1 are shown in FIG. 5 for convenience. Actually, the image display largest region PN and the feature point SP1 are not visually recognized by the user. The camera 61 can pick up an image of a range same as the visual field VR of the user.

When the feature point SP1 of the building BL and the specific direction are set (step S13 in FIG. 4), the GPS module 134 specifies the present position of the image display unit 20, that is, the present position of the user (step S14). Subsequently, the radio communication unit 132 receives position information (e.g., the latitude and the longitude) of the building BL, which is the specific target, stored in a server, which is an apparatus different from the head mounted display device 100, through radio communication and specifies a position of the building BL (e.g., the latitude and the longitude of the center of the building BL) (steep S15). The image-position control unit 165 calculates, according to the specified present position of the user and the specified position of the building BL, a distance from the present position of the user to the position of the building BL (step S16). The image-position control unit 165 sets a position of an image to be displayed on the image display unit 20 and displays the image (step S17). The image-position control unit 165 causes the image display unit 20 to display information (e.g., scheduled completion date) concerning the building BL as a character image. The image-position control unit 165 increases the character image to be displayed on the image display unit 20 in size as the distance from the present position of the user to the position of the building BL is shorter. When the character image to be displayed on the image display unit 20 is increased in size, a display region in which the image is displayed on the image display unit 20 is increased in size.

FIG. 6 is an explanatory diagram showing an example of a displayed image IM1 visually recognized by the user. In FIG. 6, the visual field VR visually recognized by the user is shown. In the image display largest region PN, the displayed image IM1 set by the image-position control unit 165 is displayed. The displayed image IM1 is a character image indicating information concerning a name of an orderer, a contractor, and a scheduled completion date of the building BL. A size of the character image of the displayed image IM1 is set by changing the image data stored in the storing unit 120 according to a distance from the present position of the user to the building BL.

When the displayed image IM1 is displayed on the image display unit 20 (step S17 in FIG. 4), the direction determining unit 166 and the GPS module 134 detect a change in a positional relation between the user, who is a wearer of the image display unit 20, and the building BL, which is the specific target (step S18). The change in the positional relation is a change in a distance from the position of the user to the position of the building BL and a change in a direction in a specific direction set in the beginning and a direction from the user to the feature point SP1 at the present point. When a change in the positional relation between the user and the building BL is detected (step S18: YES), the image-position control unit 165 sets a position of a displayed image on the image display unit 20 to fix a positional relation between the specific direction set in the beginning and a display region of the displayed image IM1 according to the change of the positional relation and causes the image display unit 20 to display the image (step S19).

FIG. 7 is an explanatory diagram showing an example of the visual field VR visually recognized by the user. In FIG. 7, compared with the visual field VR shown in FIG. 6, the distance from the image display unit 20 to the building BL, that is, the distance from the user to the building BL is short. The visual field VR visually recognized by the user when the head of the user is directed further upward is shown. As shown in FIG. 7, since the positional relation between the user and the building BL changes, the building BL is recognized larger by the user. The position of the feature point SP1 included in the outside scene image changes. Therefore, the specific direction set in the beginning and the direction from the user to the feature point SP1 at the present point change. The character image concerning the building BL is displayed in the image display largest region PN as a displayed image IM2 in a larger display region and in a larger size of characters compared with the displayed image IM1. That is, the object displayed as the characters in the displayed image IM1 is displayed as a larger object by the displayed image IM2. In this way, the image-position control unit 165 fixes the positional relation between the feature point SP1 and the display region of the displayed image IM2, that is, between the specific direction and the display region of the displayed image IM2 to the positional relation same as the positional relation before the change in the positional relation between the image display unit 20 and the feature point SP1 and causes the image display unit 20 to display the displayed image IM2.

When the displayed image IM2 is displayed on the image display unit 20 (step S19 in FIG. 4) or when a change in the positional relation is not detected in the processing in step S18 (step S18: NO), the image-position control unit 165 monitors detection of operation for ending the image display processing (step S20). When the operation for the end is not detected (step S20: NO), the direction determining unit 166 and the GPS module 134 continue to monitor a change in the positional relation between the image display unit 20 and the specific direction (step S18). When the operation for the end is detected (step S20: YES), the image-position control unit 165 ends the image display processing.

As explained above, in the head mounted display device 100 in this embodiment, the 9-axis sensor 66 and the direction determining unit 166 determine the direction of the image display unit 20. The direction from the user to the feature point SP1 is set as the specific direction. When the specific direction is set, the image-position control unit 165 sets a display region of the displayed image IM2 such that alignment for fixing the positional relation between the display region of the displayed image IM1 and the specific direction is performed according to a change in the direction of the image display unit 20. Therefore, in the head mounted display device 100 in this embodiment, since the display region is aligned with the outside scene SC, the displayed image IM1 and the displayed image IM2 are visually recognized by the user integrally with the outside scene SC. Even when the user move, since there is no shift between the outside scene SC and the displayed image IM2, it is possible to suppress visually induced motion sickness of the user.

In the head mounted display device 100 in this embodiment, the camera 61 picks up an image of the outside scene SC. The image determining unit 168 determines whether the building BL, which is the specific target, is included in the outside scene image and sets the direction from the user to the feature point SP1 of the building BL as the specific direction. Therefore, in the head mounted display device 100 in this embodiment, the specific direction is set according to the recognized specific target. Therefore, an image more suitable for the outside scene SC visually recognized by the user is displayed on the image display unit 20 and convenience for the user is improved.

In the head mounted display device 100 in this embodiment, the GPS module 134 specifies the present position of the image display unit 20. The radio communication unit 132 performs the radio communication to receive the position information of the building BL. The image-position control unit 165 increases the characters, which are the object, included in the character image to be displayed on the image display unit 20 in size as the distance from the position of the image display unit 20 to the position of the building BL is shorter. Therefore, in the head mounted display device 100 in this embodiment, the size of the character included in the character image to be displayed on the image display unit 20 changes according to the positional relation between the user and the building BL. Therefore, the user can more easily visually recognize the positional relation with the building BL and convenience for the user is further improved.

B. Comparative Example

FIG. 8 is an explanatory diagram showing an example of the visual field VR visually recognized by the user in a comparative example. In FIG. 8, like the visual field VR shown in FIG. 7, the visual field VR visually recognized by the user when the positional relation between the user and the building BL changes is shown. In FIG. 8, compared with the visual field VR shown in FIG. 7, the displayed image IM1 and the displayed image IM2 displayed on the image display unit 20 are different and the outside scene SC visually recognized by the user is the same. In the comparative example, a display region of the displayed image IM1 with respect to the image display largest region PN is fixed irrespective of a change in the positional relation between the user and the building BL. That is, the display region of the displayed image IM1 is not aligned such that the positional relation between the specific direction and the display region of the displayed image IM1 is to be fixed. Therefore, in the comparative example, when the user moves, the outside scene SC changes according to the movement of the user. However, the displayed image IM1 does not change according to the movement of the user and a shift occurs between the outside scene SC and the displayed image IM1. Therefore, it is likely that the user feels visually induced motion sickness.

C. Second Embodiment

In a second embodiment, a distance between a user and a specific target is calculated on the basis of a specific target included in an outside scene image and a reference target different from the specific target. Colors of a region where a character image or the like is displayed and a font of the character image are set according to a color of pixels of the outside scene image.

In the second embodiment, the configuration of the head mounted display device 100 is the same. However, functions of a part of the components are different. The storing unit 120 has stored therein, in addition to image data of the specific target, image data including information concerning a size of the index finger of the user serving as the reference target. When the operation unit 135 is operated, the storing unit 120 stores image data of the index finger of the user. The image determining unit 168 determines, according to pattern matching, whether the reference target same as image data of the reference target is included in an outside scene image picked up by the camera 61. The image determining unit 168 compares a size of the specific target included in the outside scene image and a size of the reference target to specify a distance between the user of the head mounted display device 100 and the specific target. The storing unit 120 in the second embodiment is equivalent to a first target storing unit and a second target storing unit in the appended claims. The reference target is equivalent to a distance reference target in the appended claims. The image determining unit 168 is equivalent to a distance specifying unit in the appended claims. The image determining unit 168 determining whether image data same as the reference target is included in the outside scene image is equivalent to the distance specifying unit discriminating the distance reference target included in a picked-up image in the appended claims.

FIGS. 9 and 10 are explanatory diagrams showing a flow of image display processing in the second embodiment. In the second embodiment, processing in step S35 and subsequent steps is different from the processing in the image display processing in the first embodiment (FIG. 4). In the image display processing in the second embodiment, the camera 61 picks up an image of an outside scene (step S31 in FIG. 9). When it is determined that the specific target is included in the outside scene image (step S33: YES), the image determining unit 168 determines whether the "index finger" of the user serving as the reference target stored in the storing unit 120 is included in the outside scene image (step S35). When it is determined that the index finger of the user is included in the outside scene image (step S35: YES), as in the first embodiment, the image determining unit 168 extracts a feature point of the specific target. The direction determining unit 166 sets a specific direction (step S37).

FIG. 11 is an explanatory diagram showing an example of the visual field VR visually recognized by the user. In the visual field VR shown in FIG. 11, a tower TW serving as the specific target, which is determined as being included in the outside scene SC and included in the outside scene image, and an index finger FG of the user serving as the reference target are shown. A feature point SP9 of the tower TW, a character image IM3 displayed in the image display largest region PN by the image display unit 20 explained below, and length Lf of the index finger and length Lt of the tower TW explained below are shown. The feature point SP9 of the tower TW, the length Lf and the length Lt, and an arrow indicating the length Lf and an arrow indicating the length Lt are shown in FIG. 11 for convenience but are not visually recognized by the user.

When the feature point SP9 and the specific direction are set, the image determining unit 168 specifies the length Lt as the size of the tower TW and specifies the length Lf as the size of the index finger FG (step S39 in FIG. 9). The index finger FG shown in FIG. 11 is erected in a state in which the user stretches the left arm straight forward. Therefore, the image determining unit 168 calculates a distance between the user wearing the image display unit 20 and the tower TW according to the trigonometry on the basis of the length Lt of the tower TW in the picked-up image and the length Lf of the index finger FG and length of the left arm of the user, the size of the tower TW, and the size of the index finger FG set in advance (step S41 in FIG. 9).

When the distance between the user and the tower TW is calculated (step S41) or when the index finger FG serving as the reference target is not detected in the processing in step S35 (step S35: NO), the image determining unit 168 binarizes pixels of the outside scene image to thereby compare the pixels with thresholds respectively set for RGB values of the pixels to classify the pixels into two. For example, to distinguish pixels representing a "blue sky" included in the outside scene, pixels having a G value equal to or larger than 150 and equal to or smaller than 230 and a B value equal to or larger than 200 and equal to or smaller than 255 and the other pixels are distinguished.

Subsequently, the image-position control unit 165 determines whether the calculated distance between the user and the tower TW are equal to or larger than a threshold set in advance (step S45). In the second embodiment, 10 kilometers (km) is set as the threshold. In the example shown in FIG. 11, the distance between the user and the tower TW is 5 km and is smaller than the threshold (step S45: NO). Therefore, the image-position control unit 165 extracts, from the center section of the image display largest region PN, candidates of a display region where the character image IM3 is displayed (step S49). In the second embodiment, the center section of the image display largest region PN means four regions in the center of the image display largest region PN equally divided into sixteen by equally dividing the image display largest region PN into four each lengthwise and crosswise. A region other than the four regions in the center is referred to as a peripheral section of the image display largest region PN. Subsequently, as shown in FIG. 11, the image-position control unit 165 sets, as a display position of the character image IM3, a portion close to the feature point SP9 out of the candidates of the display region of the character image IM3 and causes the image display unit 20 to display the character image IM3 in which the distance to the tower TW is represented by characters (step S51 in FIG. 9).

When the character image IM3 is displayed, the image determining unit 168 monitors whether the distance between the user and the tower TW changes because of movement of the user or the like (step S53 in FIG. 10). When it is determined that the distance changes (step S53: YES), the image determining unit 168 performs the processing in step S37 and subsequent steps in FIG. 9.

FIG. 12 is an explanatory diagram showing an example of the visual field VR visually recognized by the user. In FIG. 12, the visual field VR in which the distance between the user and the tower TW is increased from that in the visual field VR shown in FIG. 11 is shown. In FIG. 12, compared with FIG. 11, in addition to the increase in the distance between the user and the tower TW, time changes from the daytime to the night and the outside scene SC is dark.

After the distance between the user and the tower TW changes, when the processing in step S37 to step S41 in FIG. 9 is performed, the image determining unit 168 binarizes luminance of pixels of the outside scene image (step S43). In the visual field VR shown in FIG. 12, since the outside scene SC is dark compared with the daytime, luminance of the outside scene SC and RGB values of the outside scene image are different from those in the visual field VR shown in FIG. 11. Therefore, the image determining unit 168 binarizes the pixels in order to discriminate "night sky" included in the outside scene image. In the second embodiment, a threshold for the binarization is automatically changed on the basis of the RGB values of the pixels included in the outside scene image and time periods such as the daytime and the night. In the second embodiment, when the image-position control unit 165 causes the image display unit 20 to display a character image such as the character image IM3 or a character image IM4, the image-position control unit 165 causes the image display unit 20 to display the character image in a font of a color complementary to a color of pixels of the outside scene image overlapping a region where the character image is displayed. Therefore, as shown in FIG. 12, the image-position control unit 165 causes the image display unit 20 to display an image formed by characters of a font of white in the background of black as the character image IM4 unlike the character image IM3 (FIG. 11).

When the pixels of the outside scene image are binarized, the image-position control unit 165 determines whether the distance between the user and the tower TW is equal to or larger than a threshold (step S45 in FIG. 9). In the example shown in FIG. 12, the distance is 20 km and is equal to or larger than the threshold of 10 km (step S45: YES). Therefore, the image-position control unit 165 extracts candidates of a display region of an image from the peripheral section of the image display largest region PN (step S47). When the distance between the user and the tower TW is equal to or larger than the threshold, as shown in FIG. 12, the image-position control unit 165 causes the image display unit 20 to display the character image IM4 representing the distance to the tower TW with characters and a cursor image CS pointing the feature point SP9 that indicates that content of the character image IM4 indicates information concerning the tower TW (step S51 in FIG. 9). The cursor image CS is equivalent to image light indicating a positional relation with the specific target in the appended claims.

When it is determined in the processing in step S53 in FIG. 10 that the distance between the user and the tower TW does not change (step S53: NO), the direction determining unit 166 determines whether a visual line direction of the user changes (step S55). When it is determined that the visual line direction of the user changes (step S55: YES), the image-position control unit 165 determines whether only a part of the displayed character image IM3 or character image IM4 is displayed in the image display largest region PN (step S57). When it is determined that only a part of the character image IM3 or the character image IM4 is displayed (step S57: YES), since the display of the character image is incomplete, the image-position control unit 165 performs the processing in step S45 and subsequent steps to thereby set a display position of the character image again.

When it is determined in the processing in step S55 in FIG. 10 that the visual line direction does not change (step S55: NO) or when it is determined in the processing in step S57 that the entire character image is displayed or the entire character image is not displayed (step S57: NO), the image-position control unit 165 monitors detection of operation for ending the image display processing (step S59). When the operation for ending the image display processing is not detected (step S59: NO), the processing in step S53 and subsequent steps is performed. When the operation for ending the image display processing is detected in the processing in step S59 (step S59: YES), the image-position control unit 165 ends the image display processing.

As explained above, in the head mounted display device 100 in the second embodiment, the image determining unit 168 compares the size of the specific target included in the outside scene image and the size of the reference target to calculate a distance between the user of the head mounted display device 100 and the specific target. As shown in FIGS. 11 and 12, the image-position control unit 165 displays a different image such as the character image IM3 or the character image IM4 on the basis of the distance between the user and the specific target. Therefore, in the head mounted display device 100 in the second embodiment, an image to be displayed on the image display unit 20 is set according to the distance between the user of the head mounted display device 100 and the specific target calculated according to the size of the specific target and the size of the reference target. Consequently, it is possible to cause the user to visually recognize an image corresponding to a situation of the user and convenience for the user is improved.

In the head mounted display device 100 in the second embodiment, as shown in FIG. 12, when the distance between the user and the specific target is equal to or larger than the threshold, the image-position control unit 165 causes the image display unit 20 to display the character image IM4 and the cursor image CS. As shown in FIG. 11, when the distance between the user and the specific target is smaller than the threshold, the image-position control unit 165 causes the image display unit 20 to display the character image IM3. Therefore, in the head mounted display device 100 in the second embodiment, an image that the head mounted display device 100 causes the user to visually recognize is different depending on the distance between the user and the specific target. Therefore, the user can recognize the distance to the specific target with the displayed image and convenience for the user is improved.

In the head mounted display device 100 in the second embodiment, when the image-position control unit 165 causes the image display unit 20 to display a character image, the image-position control unit 165 causes the image display unit 20 to display the character image in a font of a color complementary to a color of pixels of the outside scene image overlapping a region where the character image is displayed. Therefore, in the head mounted display device 100 in the second embodiment, an image to be displayed is clearly visually recognized by the user without being mixed in the outside scene SC. Therefore, it is easier to cause the user to recognize the displayed image and convenience for the user is improved.

D. Modification

The invention is not limited to the embodiments explained above. The invention can be carried out in various forms without departing from the spirit of the invention. For example, modifications explained below are also possible.

D1. Modification 1

FIG. 13 is an explanatory diagram showing an example of the visual field VR visually recognized by a user in a modification. In FIG. 13, a boat race performed in a speedboat race course is visually recognized by a user. In this modification, when the operation unit 135 receives predetermined operation, the radio communication unit 132 performs transmission and reception of various kinds of information with a server managed by the speedboat race course. The image determining unit 168 recognizes, according to pattern matching, the bows of boats for racing and colors of flags attached to the bows, images of which are picked up by the camera 61. In this modification, boat numbers are allocated to the boats. The boats are a boat BT1, a boat BT2, a boat BT3, a boat BT4, and a boat BT5 in order from the boat on the right shown in FIG. 13. The image determining unit 168 extracts, as feature points of the respective boats, the respective bows of the boats included in the outside scene SC visually recognized by the user in the image display largest region PN. For example, in the bow of the boat BT5, an image of a cross is displayed on the image display unit 20 as a feature point SP5. Since the bow of the boat BT1 is not within the image display largest region PN, a feature point of the boat BT1 is not displayed on the image display unit 20.

When the feature point SP5 of the boat BT5 is extracted, the direction determining unit 166 sets, as a specific direction of the boat BT5, a direction from the user to the feature point SP5. The image-position control unit 165 causes the image display unit 20 to display a name of a racer of the boat BT5 as a character image IM05 in association with the feature point SP5. Similarly, the image-position control unit 165 causes the image display unit 20 to display names of racers of the boats BT2, BT3, and BT4 as character images IM02, IM03, and IM04 respectively on the basis of feature points SP2, SP3, and SP4. Thereafter, for example, when a positional relation between the user and the boat BT5 changes, the image-position control unit 165 sets a region of the character image IM05 displayed on the image display unit 20 such that a positional relation between the feature point SP5 of the boat BT5 and the character image IM05 is fixed.

FIG. 14 is an explanatory diagram showing an example of the visual field VR visually recognized by a user in a modification. In FIG. 14, bookshelves storing a plurality of books are visually recognized by the user in a library. In this modification, when the operation unit 135 receives predetermined operation, the radio communication unit 132 performs transmission and reception of various kinds of information with a server managed by the library. The GPS module 134 specifies position information of the user in the library. Thereafter, the head mounted display device 100 causes the user to visually recognize genres of the books stored in the bookshelves as character images according to the position information of the user and classifications of the bookshelves included in an outside scene image classified by the image determining unit 168.

The image determining unit 168 extracts feature points SP6, SP7, and SP8 as feature points of the bookshelves. The direction determining unit 166 sets, as specific directions of the respective bookshelves, directions from the user to the respective feature points SP6, SP7, and SP8. When the specific directions of the respective bookshelves are set, the image-position control unit 165 causes the image display unit 20 to display a character image IM06 of "paperback" based on the feature point SP6, a character image IM07 of "history" based on the feature point SP7, and a character image IM08 of "new publication" based on the feature point SP8. Thereafter, for example, when a positional relation between the user and the feature point SP6 changes, the image-position control unit 165 sets a region of the character image IM06 displayed on the image display unit 20 such that a positional relation between the feature point SP6 and the character image IM06 is fixed.

D2. Modification 2

In the embodiment, the direction of the image display unit 20 is specified and the specific direction from the user to the feature point is set by the 9-axis sensor 66 and the direction determining unit 166. However, a method of setting a specific direction is not limited to this and can be variously modified. For example, a specific direction may be set according to a positional relation of a specific target included in the outside scene image picked up by the camera 61. The image determining unit 168 recognizes the specific target according to pattern matching. The direction of the image display unit 20 is specified according to the specific target included in the outside scene image at a specific point in time and the specific target included in the outside scene image at another point in time. In this modification, the camera 61 and the image determining unit 168 are equivalent to a display-unit-direction specifying unit in the appended claims.

In the embodiments, the positional relation between the specific target and the feature points is set in advance. However, a method of setting the feature points with respect to the specific target is not limited to this and can be variously modified. For example, after the specific target is recognized in the outside scene image, when the operation unit 135 receives predetermined operation, the positional relation between the specific target and the feature points may be set. It is also possible to directly set the specific direction without setting the feature points.

In the embodiments, the feature points are not displayed on the image display unit 20. However, the feature points may be displayed on the image display unit 20. The specific target is stored in advance in the storing unit 120. However, the specific target may be individually set by the user when the operation unit 135 receives predetermined operation. Information concerning the specific target may be received from other storage devices different from the head mounted display device 100 via the radio communication unit 132.

D3. Modification 3

In the embodiments, the specific target included in the outside scene image is recognized, whereby the image based on the image data set in association with the specific target is displayed on the image display unit 20. The image to be displayed on the image display unit 20 does not always have to be associated with the specific target and can be variously modified. For example, when the operation unit 135 receives predetermined operation, a display position of a content moving image to be displayed on the image display unit 20 may be set according to the direction of the image display unit 20. When the content moving image is reproduced on the image display unit 20, for example, the direction determining unit 166 sets, as a specific direction, a direction from the user to the center of the content moving image during the start of the reproduction. The image-position control unit 165 sets the display position of the content moving image according to a change in the direction of the image display unit 20 such that a positional relation between the specific direction and the center of the content moving image is fixed. In this modification, unlike the embodiments, the specific target included in the outside scene SC does not always have to be recognized. Alignment is performed to fix the display region of the content moving image with respect to the outside scene SC. Therefore, even when the user moves, since there is no shift between the outside scene SC and the content moving image. Therefore, it is possible to suppress visually induced motion sickness of the user. The specific direction does not always have to be the direction from the user to the center of the content moving image, and can be variously modified, such that the operation unit 135 receives the operation to set arbitrary direction.

D4. Modification 4

In the embodiments, the size of the object displayed on the image display unit 20 changes according to the distance from the position of the image display unit 20 to the position of the specific target. However, an image that changes according to the distance is not limited to the size of the object and can be variously modified. For example, the image-position control unit 165 may display the distance from the position of the image display unit 20 to the position of the specific target according to the distance. That is, the image-position control unit 165 may display an image based on different image data on the image display unit 20. In this modification, an image to be displayed on the image display unit 20 is set according to a positional relation between the image display unit 20 and the specific target. Therefore, the user can more easily visually recognize the positional relation with the specific target and convenience for the user is further improved.

In the embodiments, the characters are explained as an example of the object included in the displayed image. However, the object is not always limited to the characters and can be variously modified. For example, the object may be a figure or a sign or may be an object obtained by compounding characters and figures.

The object may be a specific image or may be a marker or the like.

In the embodiments, the image to be displayed on the image display unit 20 is set according to the positional relation between the image display unit 20 and the specific target. However, the image to be displayed on the image display unit 20 may be set according to the outside scene image picked up by the camera 61. For example, the image determining unit 168 may detect luminance of the outside scene image (e.g., luminance of the center portion). The image-position control unit 165 may set luminance of the backlights 221 and 222 of the image display unit 20 according to the luminance of the outside scene image. The image-position control unit 165 sets the luminance of the image display unit 20 higher as the luminance of the outside scene image is higher and sets the luminance of the image display unit 20 lower as the luminance of the outside scene image is lower. In this modification, the luminance of the image display unit 20 is set according to the luminance of the outside scene image. Therefore, even if image data, on which the image to be displayed on the image display unit 20 is based, is the same, the image to be displayed on the image display unit 20 is different. Therefore, it is possible to further improve visibility of the user. The luminance of the image display unit 20 is set low when the luminance of the outside scene image is low. Therefore, it is possible to increase an operating time of the head mounted display device 100 without using unnecessary electric power.

D5. Modification 5

In the embodiments, the various displayed images are set according to, for example, the distance between the user and the specific target. However, the displayed images may be set according to, for example, a movement of the user. For example, the direction determining unit 166 determines, according to a movement of the head of the user detected by the 9-axis sensor 66, a moving state of the user such as walking or riding on an automobile. The image-position control unit 165 may set a display region of an image to cancel periodical up-down and left-right movements of a head caused by the moving state. In this modification, a relative movement of a displayed image with respect to the user due to the moving state of the user is offset. Therefore, it is possible to suppress visually induced motion sickness of the user. The 9-axis sensor 66 and the direction determining unit 166 in this modification is equivalent to a specifying unit in the appended claims.

In the embodiments, when the displayed image IM1 or the like is displayed on the image display unit 20, special setting is not performed for an image display transition time, which is time until an image in a non-display state is displayed. However, the image display transition time may be set according to, for example, a movement of the user. For example, the image-position control unit 165 sets the image display transition time longer as a movement of the head of the user is faster. That is, the image-position control unit 165 sets the image display transition time such that the image display transition time is in a relation of a monotonous increase with respect to the speed of the movement of the head of the user. During the image display transition time, when luminance of a displayed image after the image display transition time elapses is set as 100 percent, the image-position control unit 165 gradually increases the luminance according to the elapse of time to adjust the image display transition time. When the movement of the user is fast, if an image is displayed in a state in which the image display transition time is short, it is likely that display and non-display of various displayed images are frequently repeated in the visual field of the user. However, in this modification, when the movement of the user is fast, the image display transition time is set long. Therefore, it is possible to suppress a change of the image in the visual field of the user and further suppress the visually induced motion sickness of the user. Similarly, the image-position control unit 165 may set, according to the speed of the movement of the user, time in which a display state of the image changes to a non-display state of the image.

In the second embodiment, the image determining unit 168 calculates a distance between the user and the tower TW on the basis of the length Lt of the tower TW and the length Lf of the index finger FG included in the outside scene image and the length of the left arm of the user, the size of the tower TW, and the size of the index finger FG set in advance. A method of calculating a distance between the user and the tower TW can be variously modified. For example, the image determining unit 168 may calculate a distance between the user and the tower TW on the basis of a focal length of the camera 61, the length Lt of the tower TW included in the outside scene image, and the size of the tower TW set in advance. The image determining unit 168 calculates a distance between the user and the tower TW according to the trigonometry using the focal length of the camera 61 instead of the length Lf of the index finger FG. Therefore, in this modification, an image to be displayed on the image display unit 20 is set according to a distance between the user of the head mounted display device 100 and the specific target calculated according to the focal length of the camera 61 and the size of the specific target. Consequently, it is possible to cause the user to visually recognize an image corresponding to a situation of the user and convenience for the user is improved.

D6. Modification 6

In the second embodiment, the image determining unit 168 applies the binarization to the pixels forming the outside scene image to classify the pixels into two. However, a method of processing for the outside scene image is not limited to this and can be variously modified. For example, the image determining unit 168 does not apply processing such as the binarization to the pixels of the outside scene image. The image-position control unit 165 may cause the image display unit 20 to display a character image or the like on the basis of RGB values set in advance. The processing of the outside scene image does not have to be the binarization and may be, for example, processing for forming, on the basis of RGB values of the pixels without using a threshold, the character image with pixels of different colors rather than forming all the pixels in the character image in the same color. The numbers of the G value and the B value of the binarization explained in the second embodiment are examples and may be different numerical values.

In the second embodiment, the displayed image and the display region are set on the basis of the comparison result of the calculated distance between the user and the tower TW, which is the specific target, with the threshold. However, the setting of the displayed image and the display region is not limited to this and can be variously modified. For example, the image-position control unit 165 may set the display region in the same position irrespective of the distance between the user and the tower TW. The image-position control unit 165 may compare the distance between the user and the tower TW with a plurality of thresholds rather than one threshold to display an image in association with a plurality of character images and a plurality of display regions. As shown in FIG. 12, when the distance between the user and the tower TW is equal to or larger than the threshold, the image-position control unit 165 displays the two kinds of images, i.e., the character image IM4 and the cursor image CS. However, the image-position control unit 165 may display only the character image IM4 without displaying the cursor image CS. The character image IM4 and the cursor image CS are examples of the displayed image. The image-position control unit 165 may display an image different from the image in the embodiment.

In the second embodiment, the center section and the peripheral section of the image display largest region PN are set by distinguishing the regions divided into sixteen. However, the distinction of the areas in the center section and the peripheral section in the image display largest region PN can be variously modified. For example, the image-position control unit 165 may equally divide the image display largest region PN into three each lengthwise and widthwise, set one region of nine divided regions of the center of the image display largest region PN as the center section, and set the other eight regions as the peripheral section. The center section and the peripheral section of the image display largest region PN may be individually set by the user according to operation of the operation unit 135.

In the embodiments, the image determining unit 168 determines whether the image data of the specific target stored in the storing unit 120 is included in the outside scene image. However, a method of the image determining unit 168 determining the specific target included in the outside scene image can be variously modified. For example, the image determining unit 168 may determine the specific target by collating image data stored in another apparatus different from the head mounted display device 100 and the image data of the specific target included in the outside scene image.

In the embodiments, the image determining unit 168 determines, according to the pattern matching, whether the specific target and the reference target are included in the outside scene image. However, the image determining unit 168 may determine, according to a method other than the pattern matching, whether the specific target and the like are included in the outside scene image. For example, the image determining unit 168 may detect the specific target included in the outside scene image on the basis of a result obtained by binarizing colors of the pixels of the outside scene image according to specific thresholds of RGB values.

In the second embodiment, the index finger of the user is explained as an example of the reference target. However, the reference target can be variously modified. For example, the reference target may be a size of the control unit 10 of the head mounted display device 100, may be a watch or a ring worn by the user, or may be a ballpoint pen, a cellular phone, or the like carried by the user.

D7. Modification 7

In the embodiment, the operation unit 135 is formed in the control unit 10. However, a form of the operation unit 135 can be variously modified. For example, a user interface functioning as the operation unit 135 may be provided separately from the control unit 10. In this case, since the operation unit 135 is separate from the control unit 10 on which the power supply 130 and the like are formed, the operation unit 135 can be reduced in size and operability for the user is improved. When a 9-axis sensor for detecting movement of the operation unit 135 is formed in the operation unit 135 and various kinds of operation are performed on the basis of the detected movement, the user can sensuously operate the head mounted display device 100.

For example, the image-light generating unit may include an organic EL (Organic Electro-Luminescence) display and an organic EL control unit. For example, in the image-light generating unit, LCOS (Liquid crystal on silicon; LCoS is a registered trademark), a digital micro mirror device, or the like can be used instead of the LCD. For example, the invention can also be applied to a head mounted display of a laser retinal projection type. In the case of the laser retinal projection type, a "region where image light can be emitted in the image-light generating unit" can be defined as an image region recognized by the eyes of the user.

For example, the head mounted display may be a head mounted display in which the optical-image display unit covers only a part of the eyes of the user, in other words, the optical-image display unit does not completely cover the eyes of the user. The head mounted display may be a head mounted display of a so-called monocular type.

FIGS. 15A and 15B are explanatory diagrams showing the external configuration of a head mounted display device 100*a* in a modification. In an example shown in FIG. 15A, the head mounted display device 100*a* in the modification is different from the head mounted display device 100 shown in FIG. 1 in that an image display unit 20*a* includes a right optical-image display unit 26*a* instead of the right optical-image display unit 26 and includes a left optical-image display unit 28*a* instead of the left optical-image display unit 28. The right optical-image display unit 26*a* is formed smaller than the optical member in the embodiments and is arranged obliquely above the right eye of the user during mounting of the head mounted display device 100*a*. Similarly, the left optical-image display unit 28*a* is formed smaller than the optical member in the embodiments and is arranged obliquely above the left eye of the user during mounting of the head mounted display device 100*a*. In an example shown in FIG. 15B, the head mounted display device 100*a* in the modification is different from the head mounted display device 100 shown in FIG. 1 in that an image display unit 20*b* includes a right optical-image display unit 26*b* instead of the right optical image display 26 and includes a left optical-image display unit 28*b* instead of the left optical-image display unit 28. The right optical-image display unit 26*b* is formed smaller than the optical member in the embodiments and is arranged obliquely below the right eye of the user during mounting of the head mounted display. The left optical-image display unit 28*b* is formed smaller than the optical member in the embodiments and is arranged obliquely below the left eye of the user during mounting of the head mounted display. In this way, the optical-image display unit only has to be arranged near the eyes of the user. The size of the optical members formed in the optical-image display unit is also arbitrary. The head mounted display device 100 can be realized in which the optical-image display unit covers only a part of the eyes of the user, in other words, the optical-image display unit does not completely cover the eyes of the user.

As the earphones, an ear hook type or a headband type may be adopted. The earphones may be omitted. For example, the image display unit may be configured as a head mounted display mounted on vehicles such as an automobile and an airplane. For example, the image display unit may be configured as a head mounted display incorporated in body protective equipment such as a helmet.

The configuration of the head mounted display device 100 in the embodiments is only an example and can be variously modified. For example, one of the direction key 16 and the track pad 14 provided in the control unit 10 may be omitted. Another operation interface such as an operation stick may be provided in addition to or instead of the direction key 16 and the track pad 14. Input devices such as a keyboard and a mouse can be connected to the control unit 10. The control unit 10 may receive inputs from the keyboard and the mouse.

As the image display unit, for example, an image display unit of another type such as an image display unit worn like a cap may be adopted instead of the image display unit 20 worn like eyeglasses. The earphones 32 and 34 can be omitted as appropriate.

In the embodiments, the head mounted display device 100 may guide image light representing the same image to the left and right eyes of the user and cause the user to visually recognize a two-dimensional image or may guide image light representing different images to the left and right eyes of the user and cause the user to visually recognize a three-dimensional image.

In the embodiments, a part of the components realized by hardware may be replaced with software. Conversely, a part of the components realized by software may be replaced with hardware. For example, in the embodiments, the image processing unit 160 and the sound processing unit 170 are realized by the CPU 140 reading out and executing a computer program. However, these functional units may be realized by a hardware circuit.

When a part or all of the functions of the invention are realized by software, the software (a computer program) can be provided while being stored in a computer-readable recording medium. In the invention, the "computer-readable recording medium" is not limited to portable recording media such as a flexible disk and a CD-ROM and includes various internal storage devices in the computer such as a RAM and a ROM and external storage devices fixed to the computer such as a hard disk.

In the embodiments, as shown in FIGS. 1 and 2, the control unit 10 and the image display unit 20 are formed as separate components. However, the configuration of the control unit 10 and the image display unit 20 is not limited to this and can be variously modified. For example, all the components formed in the control unit 10 may be formed on the inside of the image display unit 20 or a part of the components may be formed. The power supply 130 in the embodiment may be independently formed and can be replaced. The components formed in the control unit 10 may be redundantly formed in the image forming unit 20. For example, the CPU 140 shown in FIG. 2 may be formed in both of the control unit 10 and the image display unit 20. Functions performed by the CPU 140 formed in the control unit 10 and a CPU formed in the image display unit 20 may be separated.

The control unit 10 and the image display unit 20 may be integrated to configure a wearable computer attached to clothes of the user.

The invention is not limited to the embodiments and the modifications explained above and can be realized in various configurations without departing from the spirit of the invention. For example, the technical features in the embodiments and the modifications corresponding to the technical features in the aspects described in the summary can be replaced or combined as appropriate in order to solve a part or all of the problems or in order to attain a part or all of the effects. Unless the technical features are explained in this specification as essential technical features, the technical features can be deleted as appropriate.

REFERENCE SIGNS LIST

08 Character image
10 Control unit
11 Determination key
12 Lighting unit
13 Display switching key
14 Track pad
15 Luminance switching key
16 Direction key
17 Menu key
18 Power switch
20 Image display unit
21 Right holding unit
22 Right display driving unit
23 Left holding unit
24 Left display driving unit
26 Right optical-image display unit
28 Left optical-image display unit
30 Earphone plug
32 Right earphone
34 Left earphone
40 Connecting unit
42 Right cord
44 Left cord
46 Coupling member
48 Main body cord
51, 52 Transmitting units
53, 54 Receiving units
61 Camera (image pickup unit, display-unit-direction specifying unit)
66 9-axis sensor (display-unit-direction specifying unit)
100 Head mounted display device
110 Input-information acquiring unit
120 Storing unit (first target storing unit, second target storing unit)
130 Power supply
132 Radio Communication unit (position-information receiving unit)
134 GPS module (display-unit-position specifying unit)
135 Operation unit
140 CPU
150 Operating system
160 Image processing unit
165 Image-position control unit (control unit)
166 Direction determining unit (display-unit-direction specifying unit)
168 Image determining unit (specific-direction setting unit, display-unit-direction specifying unit, distance specifying unit)
170 Sound processing unit
180 Interface
190 Display control unit
201 Right backlight control unit
202 Left backlight control unit
211 Right LCD control unit
212 Left LCD control unit
221 Right backlight
222 Left backlight
251 Right projection optical system
252 Left projection optical system
261 Right light guide plate
262 Left light guide plate
241 Right LCD
242 Left LCD
VSync Vertical synchronization signal
HSync Horizontal synchronization signal
PCLK Clock signal
OA External apparatus
SC Outside scene
RE Right eye
LE Left eye
EL, ER Ends
IL Illumination light PL Image light
BL Building
PN Image display largest region
AP Distal end
VR Visual field
IM1, IM2 Displayed image
IM02, IM03, IM04, IM05, IM06, IM07, IM08, IM3, IM4 Character images
SP1, SP2, SP3, SP4, SP5, SP6, SP7, SP8, SP9 Feature points
BT1, BT2, BT3, BT4, BT5 Boats
FG Index finger
GC Cursor image
TW Tower
Lf Length of the index finger
Lt Length of the tower

The invention claimed is:

1. A transmission type head mounted display device comprising:
an image display configured to generate image light on the basis of image data and emit the image light to an image light generation region, the image display causing a user to visually recognize the image light as a virtual image and transmitting an outside scene in a state in which the image display is worn on a head of the user, the outside scene including a specific target to which the virtual image relates; and
a processor programmed to
specify a display direction, which is a direction of the image display,
set a specific direction on the basis of a position of the specific target and the display direction, and
set a position of the virtual image on the basis of the display direction such that a positional relation between the image light generation region and the specific direction is fixed after the specific direction is set, such that the position of the virtual image relative to the specific target changes in accordance with a change in a positional relation between the image display and the specific target.

2. The head mounted display device according to claim 1, further comprising
an imaging device configured to pickup an image of the outside scene, wherein
the processor discriminates the specific target included in the picked-up image.

3. A transmission type head mounted display device comprising:
an image display configured to generate image light on the basis of image data and emit the image light to an image light generation region, the image display causing a user to visually recognize the image light as a virtual image and transmitting an outside scene in a state in which the image display is worn on a head of the user, the outside scene including a specific target to which the virtual image relates;
a processor programmed to
specify a display direction, which is a direction of the image display,
set a specific direction on the basis of a position of the specific target and the display direction, and
set a position of the virtual image on the basis of the display direction such that a positional relation between the image light generation region and the specific direction is fixed after the specific direction is set;
an imaging device configured to pickup an image of the outside scene; and
a first memory configured to store a size of the specific target, wherein
the processor is further programmed to
discriminate the specific target included in the picked-up image,
specify a distance between the image display and the specific target on the basis of a focal length of the imaging device and a size of an image of the specific target, and
set the image light on the basis of the specified distance.

4. A transmission type head mounted display device comprising:
an image display configured to generate image light on the basis of image data and emit the image light to an image light generation region, the image display causing a user to visually recognize the image light as a virtual image and transmitting an outside scene in a state in which the image display is worn on a head of the user, the outside scene including a specific target to which the virtual image relates;
a processor programmed to
specify a display direction, which is a direction of the image display,
set a specific direction on the basis of a position of the specific target and the display direction, and
set a position of the virtual image on the basis of the display direction such that a positional relation between the image light generation region and the specific direction is fixed after the specific direction is set;
an imaging device configured to pickup an image of the outside scene; and
a second memory configured to store a size of the specific target and a size of a distance reference target different from the specific target, wherein
the processor is further programmed to
discriminate the specific target included in the picked-up image,
discriminate the distance reference target included in the picked-up image and specify a distance between the image display and the specific target on the basis of a size of an image of the specific target and a size of an image of the distance reference target, and
set the image light on the basis of the specified distance.

5. The head mounted display device according to claim 3, wherein
the processor sets, when the specified distance is equal to or larger than a threshold, the image light including an object in a portion other than a center portion in a region where the image display can generate the image light and the image light indicating a positional relation between the image light including the object in the region where the image display can generate the image light and the specific target included in the picked-up image, and sets, when the specified distance is smaller than the threshold, the image light including the object in the center portion in the region where the image display can generate the image light.

6. The head mounted display device according to claim 2, further comprising:
a positioning module configured to specify a position of the image display; and
a communication device configured to receive information for specifying the position of the specific target, wherein the processor sets the image light on the basis of the positional relation between the image display and the specific target.

7. The head mounted display device according to claim 3, wherein
the processor sets an object included in the image light to be larger as a distance from the position of the image display to the position of the specific target is shorter.

8. The head mounted display device according to claim 2, wherein
the processor sets the image light on the basis of a color of pixels in a portion other than an image of the specific target in the picked-up image.

9. The head mounted display device according to claim 8, wherein
the processor sets the image light such that a color of pixels forming an object included in the image light is a color complementary to the color of the pixels of the portion other than the image of the specific target.

10. The head mounted display device according to claim 2, wherein
the processor sets luminance of the image light on the basis of luminance of the picked-up image.

11. The head mounted display device according to claim 10, wherein
the processor sets the luminance of the image light higher as the luminance of the picked-up image is higher.

12. The head mounted display device according to claim 1, wherein
the processor is further programmed to
specify a movement of the image display, and
set a position of the image light generation region on the basis of a moving state of the user specified on the basis of the movement of the image display.

13. The head mounted display device according to claim 12, wherein
the processor sets time for changing the image light from a state in which the image light is not visually recognized by the user to a state in which the image light is visually recognized by the user and time for changing the image light from the state in which the image light is visually recognized by the user to the state in which the image light is not visually recognized by the user in a relation in which at least one of the times monotonously increases with respect to speed of the movement of the image display.

14. A control method for a transmission type head mounted display device including an image display configured to generate image light on the basis of image data and emit the image light to an image light generation region, the image display causing a user to visually recognize the image light as a virtual image and transmitting an outside scene in a state in which the image display is worn on the head of the user, the outside scene including a specific target to which the virtual image relates, the control method comprising:
specifying a display direction, which is a direction of the image display;
setting a specific direction on the basis of a position of the specific target and the display direction; and
setting a position of the virtual image on the basis of the display direction such that a positional relation between the image light generation region and the specific direction is fixed after the specific direction is set, such that the position of the virtual image relative to the specific target changes in accordance with a change in a positional relation between the image display and the specific target.

* * * * *